United States Patent [19]

Daniels et al.

[11] Patent Number: 5,802,539
[45] Date of Patent: Sep. 1, 1998

[54] METHOD AND APPARATUS FOR MANAGING TEXT OBJECTS FOR PROVIDING TEXT TO BE INTERPRETED ACROSS COMPUTER OPERATING SYSTEMS USING DIFFERENT HUMAN LANGUAGES

[75] Inventors: Andrew M. Daniels, Menlo Park; Andrew Wilson, San Francisco, both of Calif.

[73] Assignee: Apple Computer, Inc., Cupertino, Calif.

[21] Appl. No.: 642,059

[22] Filed: May 3, 1996

Related U.S. Application Data

[63] Continuation-in-part of Ser. No. 435,393, May 5, 1995, abandoned.

[51] Int. Cl.$^6$ .................................................. G06F 7/00
[52] U.S. Cl. .................................................. 707/542; 704/7
[58] Field of Search .................................. 395/805, 114, 395/115, 791, 793, 794, 751, 752, 757; 707/542, 529, 531, 532; 704/1, 2, 7

[56] References Cited

U.S. PATENT DOCUMENTS

| | | | |
|---|---|---|---|
| 5,091,950 | 2/1992 | Ahmed | 395/2.86 |
| 5,251,293 | 10/1993 | Ishii et al. | 395/805 |
| 5,444,829 | 8/1995 | Kawabata et al. | 707/542 |
| 5,495,560 | 2/1996 | Kumada | 395/114 |
| 5,500,931 | 3/1996 | Sonnenschein | 395/791 |
| 5,533,180 | 7/1996 | Zhou et al. | 707/542 |

OTHER PUBLICATIONS

WordPerfect Corporation, WordPerfect of Windows, Version 5.1, 1991, Screen Printout.

*Primary Examiner*—Joseph H. Feild
*Assistant Examiner*—Stephen Hong
*Attorney, Agent, or Firm*—Beyer & Weaver, LLP

[57] ABSTRACT

Text objects having a primary data portion in which is stored text characters and associated encoding information, and an annotation portion in which is stored attribute information such as style and language identifiers, is described. The encoding information is stored within a run header in the primary data portion and both the run header and attribute header refer to the text characters to thereby define a text run. Also described are operations for manipulating the text objects of the invention and for creating and deleting annotations. The operations for manipulating the text objects of the invention include installing text within a text object, copying text in a text object, replacing text in a text object, writing text in a text object and imaging text in a text object for display.

49 Claims, 24 Drawing Sheets

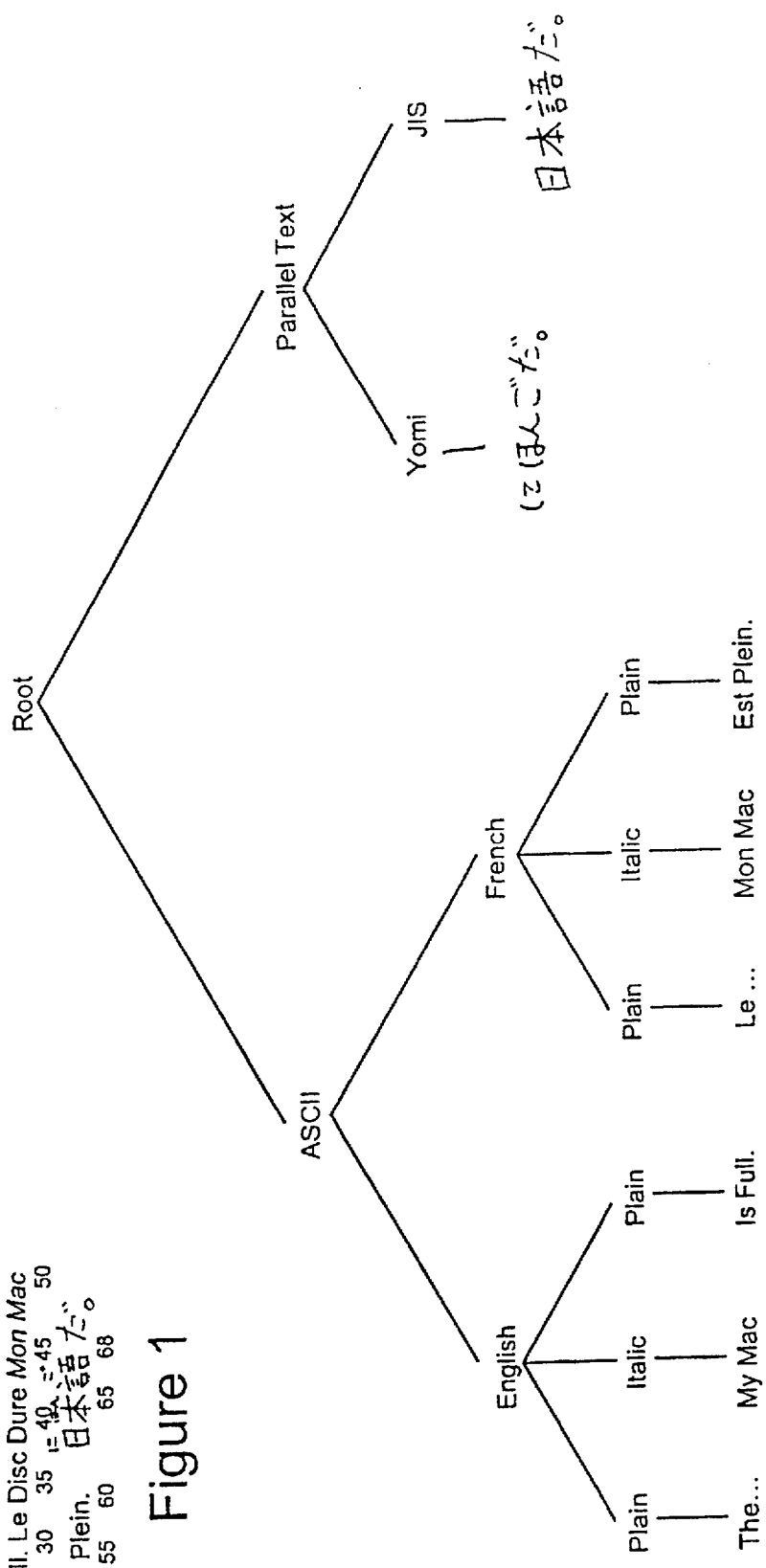

METHOD AND APPARATUS FOR MANAGING TEXT OBJECTS FOR PROVIDING TEXT TO BE INTERPRETED ACROSS COMPUTER OPERATING SYSTEMS USING DIFFERENT HUMAN LANGUAGES

CROSS-REFERENCE TO RELATED APPLICATION

This application is a continuation-in-part of U.S. patent application Ser. No. 08/435,393 entitled METHOD AND APPARATUS FOR MANAGING TEXT OBJECTS, filed May 5, 1995 now abandoned, and naming Andrew Daniels and Andrew Wilson as inventors. This application is incorporated herein by reference in its entirety and for all purposes.

BACKGROUND OF THE INVENTION

1. The Field of the Invention

The present invention relates to methods and systems for generating text for the user interface of computer operating systems. More particularly, the present invention relates to methods and systems for generating text objects for providing text that can be interpreted across computer operating systems using different human languages.

2. The Relevant Art

The computer industry has become increasingly internationalized over the past decades. This expansion outside of the borders of the United States has been driven both by the increasing technological sophistication of foreign countries as well as the growth of large scale computer networks over which information is transferred by private individuals and multinational corporations alike. The increased global use of computer systems, and especially personal computer systems, has led to the wide-spread sale of U.S. developed operating systems such as MS-DOS, Windows and the Macintosh® operating systems, each of which was developed originally for users who understand English.

The increasing demand for U.S.-developed computer operating systems abroad has created difficulties in providing support for users who understand languages other than English. In general, it is cost prohibitive to write an entirely new version of operating system software to accommodate the language of the particular geographical region in which the software is sold. This is especially true given that different countries employ different standards for encoding text characters (i.e., the systems by which letters, numbers and various textual symbols are assigned numeric codes for use by computer hardware and software, also known as a "character sets"). For example, the standard developed in the U.S. for encoding text characters, the American Standard Code for Information Interchange (ASCII), provides a different encoding standard from the International Standards Organization (ISO) which predominates in Europe, and the Japanese Information Standard (JIS) which is dominant in Japan. Yet, each of these geographical regions represents an important market for computer operating system, especially operating systems for personal computers Indeed, not only do character sets differ between major geographical regions (e.g., France and Japan), character sets also differ within the same language. For example, the character sets for Russian include MacCyrilic, KOI-8 and at least two DOS code pages. Also, individual computer operating systems can have character sets different from those defined by broad standards, such as ASCII, to support characters not handled by the broad standards. Thus, developers of computer operating systems have concentrated on providing data structures for handing textual information that allow for the conversion of character sets between different standards so that text characters are mapped between different character sets faithfully. This is not to imply, however, that the mapping of text characters between different character sets results in a translation of the human languages.

One method for providing the translation of text between different character sets is illustrated with respect to the text shown in FIG. 1. There, a representative system message is provided in both roman text, here English and French, and in Kanji and Hiragana. The positions of the characters are numbered for convenience. As will be apparent from the Figure, the text includes twenty nine characters of English which can be represented in the computer in one of several encodings. Generally, for use in the United States the character are represented in the ASCII format. Characters 30–60 are also a roman script, but this time the language is French. Such text typically would be represented by a different encoding such as an ISO standard. Characters 61–68 would be represented typically using JIS or Shift-JIS.

In addition, the text provided in FIG. 1 includes certain style differences. For example, characters 15–20 and characters 44–50 are displayed in italic. In addition, with respect to ideograph based languages such as Japanese, characters may be provided in order to supply indications as to how the characters are to be pronounced. Thus, it will be seen that the types of text to be handled by an operating system include not only various encodings which define the text, but also the styles and even pronunciations of those characters.

Some systems presently existing allow for the storage of text data having multiple encodings (e.g., ISO 2022 and EUC). However, these systems do not allow for the attachment of non-textual information, such as style, language or pronunciation data. These systems also place restrictions on the encodings that can be used for the text. Thus, these methods have narrow applicability.

One method presently employed for handling the problems of translating text across different encodings that avoids the limitations of systems such as ISO 2022 and EUC is the "compound string" method employed by the X-windows operating system. This standard is a variant of the ASN1 standard. In this method, the text string to be stored, such as that shown in FIG. 1, is viewed as a nested structure in which the text is first divided into its constituent encodings and then subdivided into language subgroups and then finally into text styles.

For example, as shown in FIG. 2, the statement of FIG. 1 is organized according to the compound string method. At the first level following the root level of the data structure the text is first divided into ASCII and JIS encoding families. Within the ASCII family the text is furthered divided into English and French subfamilies. Thus, characters 1–30 representing the text "The Hard Disk My Mac is Full." fall into the English family, while characters 31–60, representing the text "Le Disc Dur Mon Mac Est Plein." fall within the French family. Finally, the ASCII/English and ASCII/French characters are further divided by individual text styles. Thus, characters 1–14 and 21–29, representing the substrings "The Hard Disk " and "Is Full." fall within the nesting of ASCII/English/Plain family. Characters 15–20 ("My Mac") fall within the Italics subgroup of the English subfamily. The French text is divided similarly. The other major family, the JIS family, is broken into different branches which may include the actual characters presented as well as their associated pronunciations.

FIG. 3 illustrates the data structure at 300 for the text shown in FIG. 1. The nesting of the data structure is demonstrated by the arrangement of the information first into the three encodings, shown generally at 302 for the ASCII-encoded English text, 304 for ASCII-encoded French text and 306 for JIS-encoded Japanese text (together pronunciation data). The ASCII portion 302 includes an encoding identifier field 308 and a field indicating the total number of bytes of text 310. The English portion is identified in field 312 and the total number of bytes of English text is identified in field 314. The English characters are then placed in the fields following field 314, beginning with field 316 which holds character 1 of the text shown in FIG. 1 ("T"). The field identifying the French portion of the data structure, field 318, follows the field containing last English character. The French portion includes byte field 320 and character field 322 by analogy to the English portion just described.

Japanese portion 306, which begins with identifier field 323, indicating that the Japanese portion has parallel streams of data (JIS and Yomi) has a slightly different format. Field 324 holds the total length of parallel text, field 326 is a marker identifying the beginning of the Yomi stream of data and field 328 indicates the amount of Yomi text information. Reading information is placed in fields 328. This information corresponds to the pronunciation information shown in FIG. 2. The marker indicating the beginning of the JIS-encoded text is at 329. The data structure ends with the last character of JIS-encoded text at 330.

It will be appreciated that the above-described compound string data structure is extremely complicated to handle, and does not lend itself to efficient processing. For example, in order to fully analyze the string for its content and style the entire hierarchical structure must be traversed. Thus, processor overhead must be incurred to analyze the different families and subfamilies and even to search for certain patterns indicting that particular styles cross different subdirectory boundaries. For example, referring back to FIG. 1, if characters 25–35 were italicized, that fact would not be apparent unless the entire tree structure shown in FIG. 2 were traversed and the pattern indicating that both the French and English words shared the same style was uncovered. Finally, the nested structure of the compound string scheme produces redundancy of information. For example, data indicating that characters 15–20 and 44–50 are italic must be provided twice—once for each language branch of the ASCII portion of the data structure. Thus, it is not surprising that many programmers simply do not bother to include code to handle the translation of text from one encoding scheme to another, resulting in what is referred to as "moji-bake", i.e., text that becomes garbled as it is moved from an application using a first encoding to an application in a second encoding.

Although this may seem as a relatively infrequent and minor difficulty to overcome for the user, the above-described growth in multilingual operating systems makes maintaining fidelity between character encoding schemes a serious problem for structuring operating systems. For example, without a means for handling the change of encoding schemes file names can become severely corrupted upon moving from one encoding system to another. This problem is only compounded by the growth of international computer networks over which users in different countries speaking different languages and running different language versions of the same operating system attempt to share files. Thus, it would be desirable to have a system in which text is processed efficiently and accurately among different character sets.

SUMMARY OF THE INVENTION

The present invention overcomes the above-described deficiencies in present methods for providing text strings in operating systems. Using the text objects and the procedures for manipulating text objects described herein, text may be handled more efficiently by an operating system. More particularly, using the text objects and methods of the present invention, text objects may be processed more efficiently among operating systems using different character sets for displaying text string. Thus, as will be seen herein the present invention provides support for text in operating systems that is more robust and processed more efficiently than present methods.

In one embodiment, the present invention includes a computer implemented method for creating a text object. The text object of the invention has a primary data portion and an annotation portion. In the method of the invention, a string of text characters is provided in addition with at least one run header associated with a string of text characters and at least one attribute header associated with a string of text characters. The text characters and the run header are stored under computer control in the primary data portion, and the attribute header is stored under computer control in the annotation portion. The attribute header and the run header refer to at least a portion of the text characters to define thereby at least one text run.

In one embodiment, the attribute header comprises a style definition for a least a portion of the text characters stored in the text object. In another embodiment, the attribute header includes a language definition for at least a portion of the text characters stored in the text object. In still another embodiment the run header includes an encoding definition for at least a portion of the text characters stored in the text object.

In another aspect, the present invention includes a computer system for creating and managing a text object. The system and method of the invention included data input system to provide a string of text characters, at least one run header for the string of text characters, and at least one attribute header for the string of text characters. In addition, the system of the invention includes a storage mechanism for storing, under computer control, the string of text character and the run header and the attribute header. The string of text characters and the run header are stored in a memory location of the computer system that corresponds to the primary data portion of the text object. The attribute header is stored in the memory location of the computer system corresponding to the annotation portion of the text object. The attribute header and the run header both refer to portions of the text characters such that at least one text run is defined.

In one embodiment, the attribute header comprises a style definition for a least a portion of the text characters stored in the text object. In another embodiment, the attribute header includes a language definition for at least a portion of the text characters stored in the text object. In still another embodiment the run header includes an encoding definition for at least a portion of the text characters stored in the text object.

In still another aspect, the present invention includes the text object suitable for use in the computer system. The text object includes a primary data portion that include a string of text characters and at least one run header for the string of text characters. The text object also includes an annotation portion comprising an attribute header for the string of text characters. The attribute header and the annotation portion and the run header in the primary data portion both refer to the text character such that at least one text run is defined.

These and other aspects and advantages of the present invention will become apparent when the following detailed description is read in conjunction the accompanying Figures.

BRIEF DESCRIPTION OF THE DRAWINGS

FIG. 1 is an illustration of a multilingual text string.

FIG. 2 is an illustration of the logical data structure according to the compound string method of the prior art.

DESCRIPTION OF SPECIFIC EMBODIMENTS
I. TEXT OBJECTS

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms, such as identifying, running, or comparing. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an computer system for performing these operations. This computer system may be specially constructed for the required purposes, or it may be a general purpose computer selectively activated or reconfigured by a computer program stored in the computer. The processes presented herein are not inherently related to any particular computer or other computing apparatus. In particular, various general purpose computing machines may be used with programs written in accordance with the teachings herein, or it may be more convenient to construct a more specialized computer apparatus to perform the required method steps. The required structure for a variety of these machines will appear from the description given below.

Figure 3:
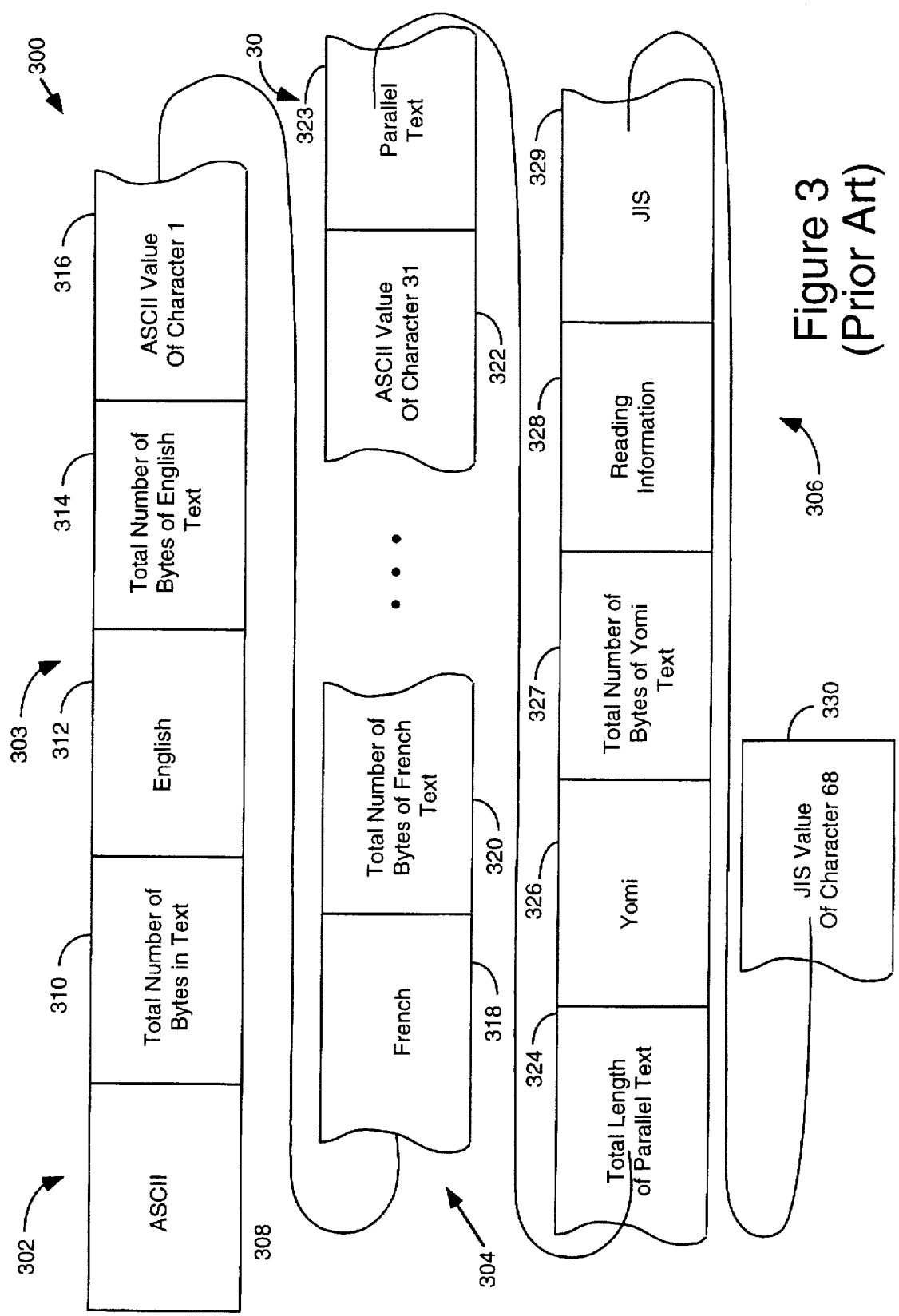
FIG. 3 is an illustration of an actual data structure in accordance with the compound string method of the prior art.
Figure 4:
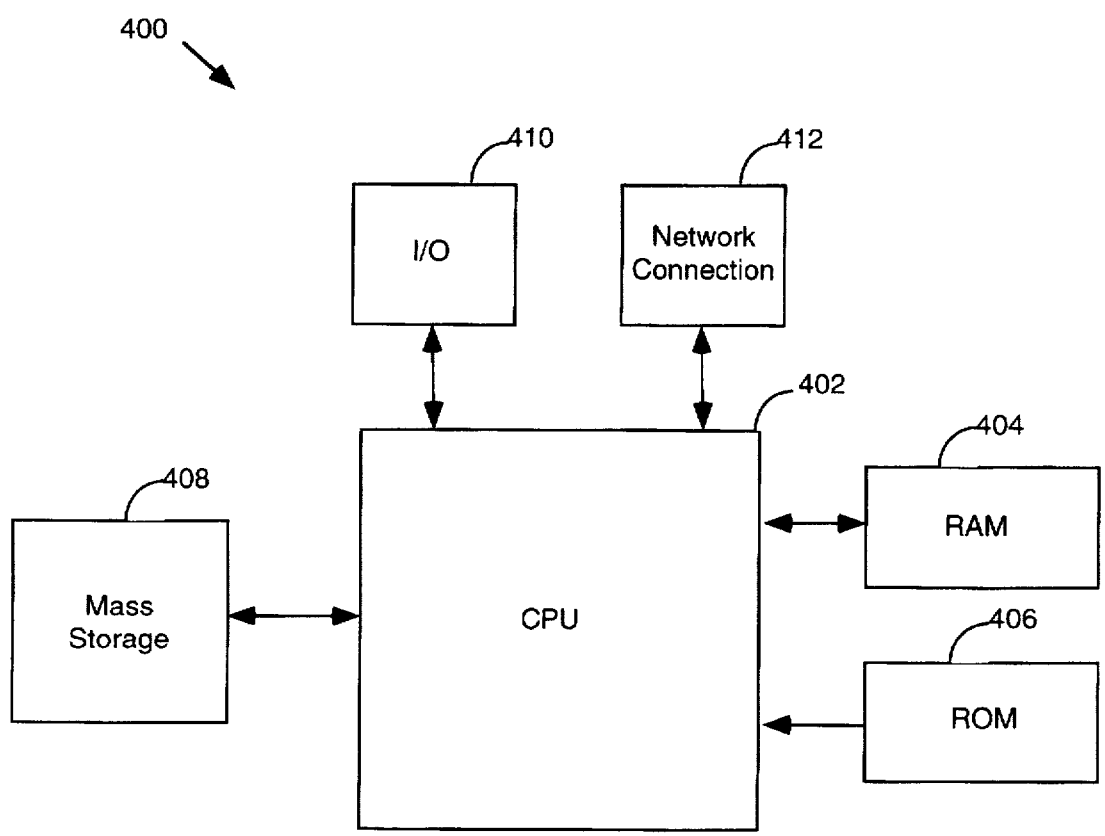
FIG. 4 is an illustration of a computer system in accordance with the present invention.

A computer system in accordance with the present invention is illustrated schematically in FIG. 4 at 400. The computer system includes a central processing unit (CPU) 402, which CPU is coupled bidirectionally with random access memory (RAM) 404 and unidirectionally with read only memory (ROM) 406. Typically RAM 404 includes programming instructions and data, including text objects as described herein in addition to other data and instructions for processes currently operating on CPU 402. ROM 406 typically includes basic operating instructions, data and objects used by the computer to perform its functions. In addition, a mass storage device 408, such as a hard disk, CD ROM, magneto-optical (floptical) drive, tape drive or the like, is coupled bidirectionally with CPU 402. Mass storage device 408 generally includes additional programming instructions, data and text objects that typically are not in active use by the CPU, although the address space may be accessed by the CPU, e.g., for virtual memory or the like. Each of the above described computers further includes an input/output source 410 that typically includes input media such as a keyboard, pointer devices (e.g., a mouse or stylus) and the like. Each computer can also include a network connection 412 over which data, including, e.g., text objects, and instructions can be transferred. Additional mass storage devices (not shown) may also be connected to CPU 402 through network connection 412. It will be appreciated by those skilled in the art that the above described hardware and software elements, as well as networking devices, are of standard design and construction.

In one aspect, the present invention provides a text object data structure that substantially overcomes the problems described above with respect to prior art methods of handling text across different languages and encodings. In particular, the text object of the invention includes a text object data structure in which text is stored in "runs"— segments of characters having the same encoding—that follow the sequence of characters in the text string. Thus, the text objects of the present invention preserve the continuity of the textual data being stored. In addition, the text objects of the invention store data concerning text attributes, such as style (e.g., bold or italic text) and language, separately from the characters and text encoding information, thus eliminating the above-described redundancy of information.

The text objects of the invention can be used as a means of passing data within a single operating system, among the operating systems of two or more computers and/or between the user and the operating system of at least one computer. In a preferred embodiment, the operating system is the Macintosh® operating system. It will be appreciated by those having skill in the art of programming computers running the Macintosh® operating system that the text objects of the invention can be used in any aspect in which a "Str255" data type is appropriate, e.g., in the text of menus titles, menu choices, dialog boxes, window titles, file names and the like, such as described in *Inside Macintosh: Macintosh Toolbox Essentials* (Addison-Wesley 1993) which is incorporated herein by reference. Those having skill in the art will also appreciate, however, that the text objects of the invention will have utility in applications outside of those for which Str255 data types are used, and can be adapted use with other operating systems.

One embodiment of the present invention is shown at 500 in FIG. 5. As seen in FIG. 5, the present invention includes a data structure in which the information for the encodings and strings text characters is logically kept separate from the information describing the language and style attributes of the text. Thus, the text object shown at 500 includes a primary data portion 501 for storing text characters and encodings and an annotation portion 502 including attribute data for the text stored in the primary portion, such as text styles. A text object header 503 is also included. Primary portion 501 and annotation portion 502 may be stored in separate or contiguous memory locations in the computer system, such as RAM 404, ROM 406 or Mass Storage 408 of FIG. 4. In one embodiment, shown in FIG. 5, primary portion 501, annotation portion 502 and text object header 503 are stored in contiguous memory locations.

In more detail, the text object header 503 includes a total object size field 504 which contains the size (e.g., in bytes) for the entire text object in addition to an object attributes field 506 which holds additional data concerning the text object. In one embodiment, the object attribute field includes three subfields. One subfield contains a flag indicating whether the text object is a persistent test object or a ephemeral text object. As used herein, the term "persistent text object" refers to an object for which the allocation of memory is the responsibility of the programmer creating the text object. An "ephemeral text object" is a text object whose memory is allocated automatically by the operating system. A second subfield of the object attribute field 506 is a field indicating the version number of the text object, allowing, for example, the programmer to keep track of the revisions made to the text object data structure. A third subfield of the object attribute field is an alternate flag field containing a flag that can be used to indicate a variety of conditions including, for example, that no annotations are included with the text objects or that the text object contains only one text run.

Primary data portion 501 includes one or more run headers, such as run header 507 and 507'. Run header 507, describing Run 1 in the data structure, includes a run length field 508 holding the length (e.g., in bytes) of the entire run of characters stored in fields 507–524, a run type field 510 describing the nature of the data stored in fields 514–524 (e.g., "text") and an encoding field 512 describing the character set for the stored characters (e.g., ASCII). In one embodiment, encoding field 512 contains subfields describing the major encoding identifier (e.g., ASCII), the variant (i.e., the version of the major encoding identifier) and the character type (e.g., whether the characters stored are one-byte characters or two-byte characters).

Starting at field 514 and ending at field 524 the actual characters are stored. In one embodiment, the width of a data field is 4 bytes across, allowing for four, one-byte characters to be stored per data field (subfields 516–522 of field 514 and subfields 526–532 of field 524). In some cases the characters to be stored will occupy two bytes (e.g., Japanese, Chinese and Korean characters). However, it will be appreciated that other field widths may be used without departing from the invention. Preferably, fields that are only filled partially are padded. It will be appreciated by those of skill in the art that the actual memory allocations for different runs having different encodings may either be contiguous or separate.

Figure 5A:
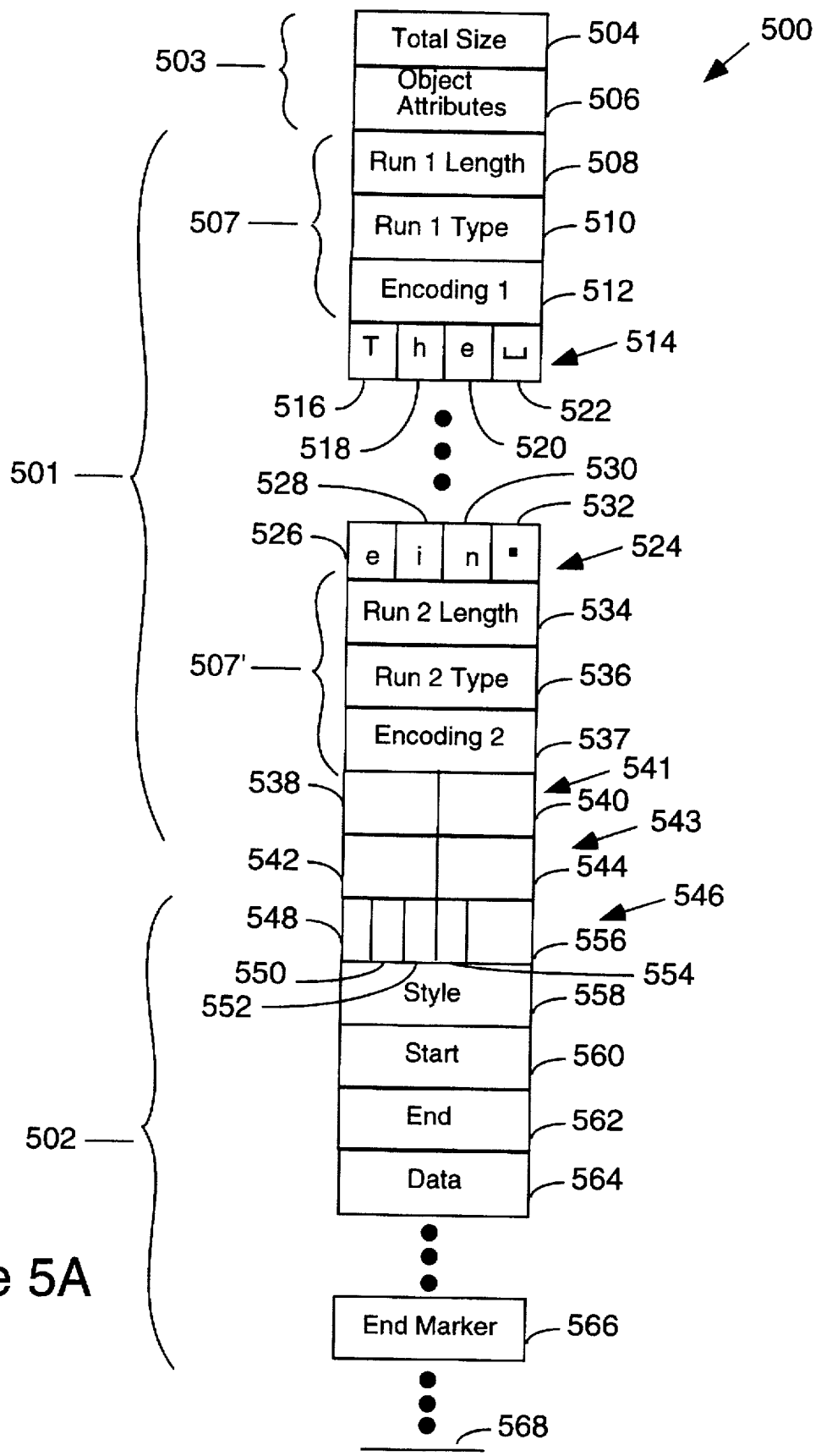
FIGS. 5A and 5B are an illustrations of data structures in accordance with the present invention.

In the example shown in FIG. 5A, the text of FIG. 1 begins in subfield 516 with "T". Field 518 holds the letter "h" field 520 the letter "e" and 522 contains the character representing the space between the word "The" and "Hard". The data for the first 60 characters continues as just indicated for fields 516–522 ending as shown in fields 526,528, 530 and 532 which contain the letters "e", "i" and "n" and the period at character 60.

Similarly, run header 507', describing Run 2, includes a length field 534, a type field 536 and an Encoding field 537. In the example shown, type field 536 is the same as type field 510 (e.g., "text"). Encoding field 537 differs from field 512 (JIS versus ASCII). Fields 541 and 543 in this example comprise two subfields each (subfields 538 and 540 for field 541 and subfields 542 and 544 for subfield 543). As the example shown in FIG. 5A illustrates the storage of the text shown in FIG. 1, the widths of the subfields are two bytes each to accommodate the Japanese characters.

Annotation portion 502 includes, in one embodiment, an attribute header 546 which can comprise one or more subfields such as subfields 548–556. In the particular embodiment illustrated in FIG. 5A, subfield 548 holds a format flag, indicating whether the annotation is in a long or short format, a first alternation flag 550 indicating whether a change has been made to the text in the region to which the annotation pertains, a second alteration flag 552 indicating whether a change has occurred anywhere in the text, a general purpose marker 554 to be used for miscellaneous flags and a length field 556 for describing the length of the annotation. Following field 546 is a style field 558 identifying the type of annotation (e.g., "styl" for a style annotation or "lang" for a language annotation) for the range spanned by the values held in fields 560 and 562 which hold references, or indices, to the beginning and ending characters of the run. It will be appreciated that the references or indices may be pointers to the memory addresses of those characters or some other index for determining character location, e.g., an offset, which identifies the beginning and ending characters of the run uniquely. Finally, field 564 holds the annotation data (e.g., "italic" for an annotation of type "styl" or "French" for an annotation of type "lang"). The data field 564 can also contain data or references to data such as sound and/or pictures that are to be associated with the characters in the range defined by fields 560 and 562. It will be appreciated that additional annotations (not shown) are included to described the text in FIG. 1. The annotations can arranged be in any order. In a preferred embodiment, padding is added to the end of the annotations to fill any gaps in the width of a data field.

Thus, in the example shown in FIG. 5A, one annotation would be provided for each language run, for each style run and for the Yomi pronunciation. An annotation for the language run corresponding to the first thirty characters would include, in addition to the header information, an identifier such as "lang" in field 558, references to characters 0 and 30 in fields 560 and 562, respectively and annotation data such as a code indicating that the language of the text between 0 and 30 is English. An annotation for the italic style would have an identifier such as "styl" in field 558, references to characters 15 and 20 in fields 560 and 562, and a code indicating that the text between those values is italic. Finally, an annotation for the pronunciation text would include an identifier such as "Yomi" in field 558, references to characters 61 and 64 in fields 560 and 562 and phonetic for the pronunciation in field 564 (e.g., for text-to-speech or collation). Preferably, if there is any space remaining between the end of the last annotation and the end of the allocated memory, there should be an end marker, such as end marker 566. Any remaining space between end marker 566 and the end of the memory allocated space 568 can be filled with padding to bring the total size into conformity with the actual size of the object.

Figure 5B:
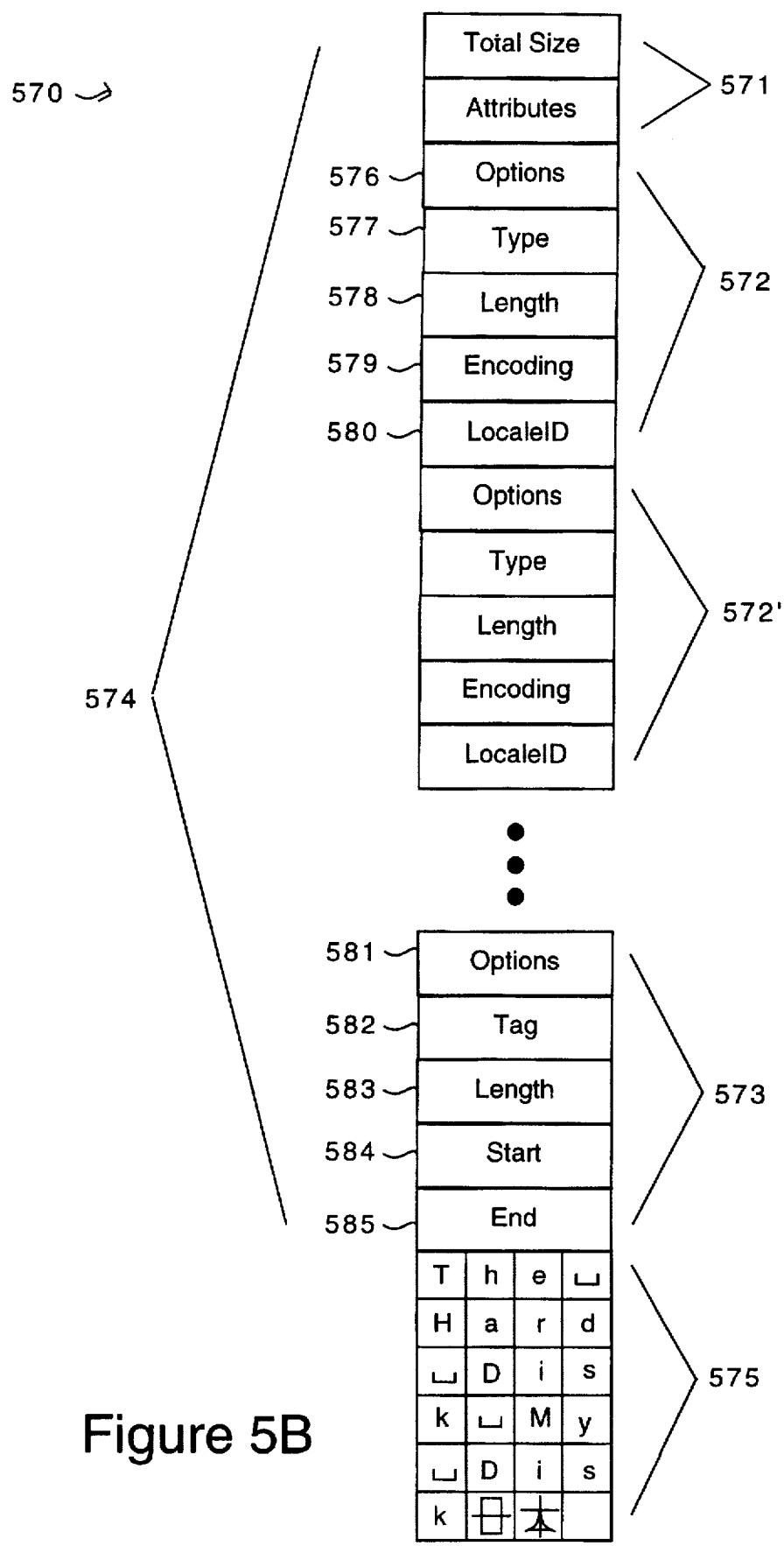

An alternative embodiment of the data structure 500 is shown in FIG. 5B at 570. There, header 571 is the same as described above with respect to FIG. 5A, but run headers 572 and 572' are concatenated, as are the annotation portions 573 into a table of contents portion 574. Each run of text has a corresponding run header and may have one or more corresponding annotation portions. The text data follows in a data portion 575. The text data can either follow the table of contents (as shown in FIG. 5B) or can preceded the table contents (not shown). In either case, it will be appreciated that the former and latter portions can be read in opposite directions to increase efficiency with respect to appending new text runs as the new text data and the new table of contents information can be added to end of the table of contents and data portions simultaneously without the need to adjust the memory locations of the records.

In one embodiment, each run header comprises an options field 576, a run type field 577, a length field 578, an encoding field 579, and a locale identifier (localeID) 580 for identifying the language and region of a particular language (e.g., the language English, and the region U.S.). A variant code may also be included. Options field 576 includes two bits identifying whether (1) the entry is in abbreviated format, and (2) whether the current entry is the last entry in the data structure. The length, type, and encoding fields (577–579, respectively) are identical to those described above in FIG. 5A.

Annotations portion 573 includes an options field 581, a tag field 582, a length field 583, a start field 584, and an end field 585. Options field 581 is identical to options field 576 described above. Tag field 582 describes a unique annotation identifier (e.g., "styl"). Length field 583 describes the amount of data while start and end fields 584 and 585 describe the starting and ending points of the text over which the annotation is applied. Data portion 575 contains the actual text data corresponding to the run headers and annotation portions. In one embodiment, the text data in data portion 575 is "byte aligned" (i.e., the text characters occupy the memory locations seriatim as opposed to being padded in a "long aligned" format such as shown in FIG. 5A).

Figure 6:
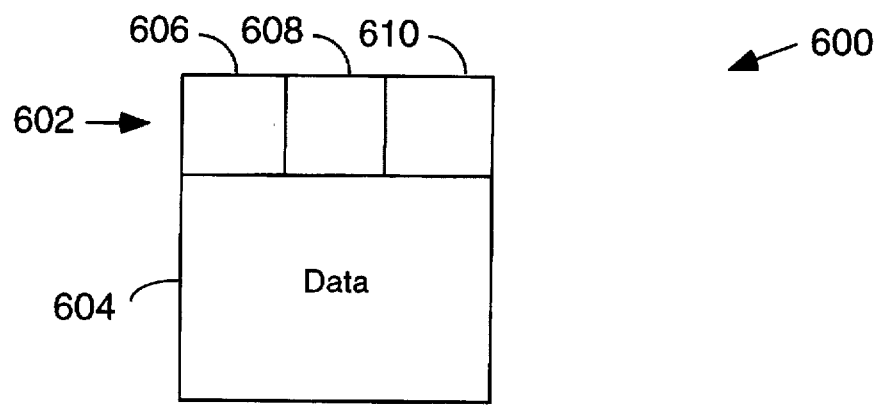
FIG. 6 is an illustration of a data structure in accordance with the present invention in a short format.

FIG. 6 illustrates one embodiment of a "short format" for the primary data portion of the text object of the invention at 600. In the short format illustrated in FIG. 6, the run header 507 is compressed into a single compressed header field 602 which precedes the data fields, shown generally at 604 (including any padding). The data fields are substantially identical to those described above with respect to FIG. 5A, containing the text characters of the text object and any padding required to fill the data fields. Corresponding short formats can be derived for the data structure of FIG. 5B by analogy.

Compressed run header 602 comprises a format flag 606, a text encoding field 608 and a run length field 610. In one embodiment, format flag 606 comprises one bit of the header field (e.g., the sign bit in twos format), with encoding field 608 and run length field 610 occupying the remainder of the field. Encoding field 608 contains a code corresponding to a preferred encoding scheme (e.g., Unicode, ASCII or an encoding scheme specific to the operating system). This allows the type and encoding to be collapsed into a single field. It will be appreciated that the short format is useful for conserving the amount of memory occupied by the text object. The remaining space can be reserved for other uses. Other compression schemes can also be used in conjunction with the data structures described herein as will be apparent to those having skill in the art.

Figure 7:
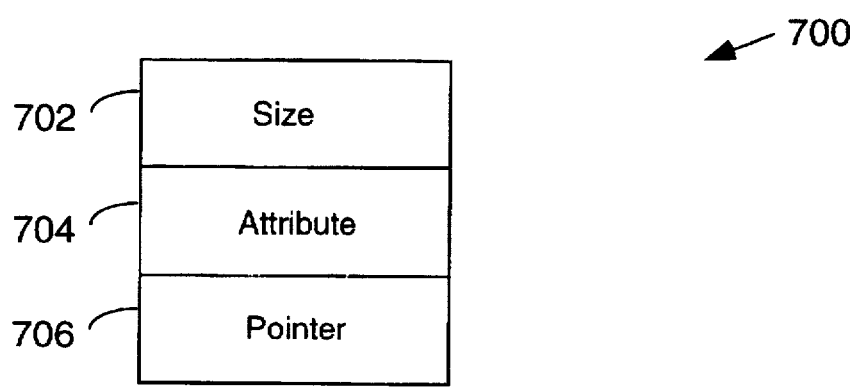
FIG. 7 is an illustration of an ephemeral data structure in accordance with the present invention.

FIGS. 5A, 5B, and 6 above are illustrations of "persistent" objects in which the header and data are kept together in memory. As noted above, however, text objects can be ephemeral. In one embodiment, memory for persistent text objects is allocated by the programmer, while memory for ephemeral text objects is allocated by the operating system. FIG. 7 illustrates one embodiment of an ephemeral text object at 700. Ephemeral text objects includes a size header 702, an attribute field 704 and a pointer 706 that points to a memory location at which the above-described primary data portion and annotation portion are stored. The size header and attribute fields comprise the same data as described in FIG. 5A above for text object size field 504 and object attribute field 506. It will be appreciated by those having skill in the programming arts that other embodiments of ephemeral text objects can be practiced in accordance with structure just described. For example, pointer 706 can refer to a look-up table (LUT) which contains the addresses of the primary data and annotation portions. The use of such a double indirection allows greater flexibility in data management by the operating system, which can move the memory locations of the primary data and annotation portions without affecting the ephemeral text object.

II. MANAGING TEXT OBJECTS

In another aspect, the present invention provides methods for managing text objects. The methods include methods for installing text in text objects, writing text to text objects, replacing text in text objects, extracting substituting and copying text from text objects, imaging text in text objects (e.g., for screen display), and creating and deleting annotations. These methods, which are described below, can be implemented using techniques known to those of skill in the computer programming arts.

In one embodiment, the above-listed management operations are performed using various application programmer interfaces (APIs), the formation and use of which will be known to those of skill in the art. One advantage to the use of APIs for performing management operations stems from the high degree of opacity provided by these interfaces, as the programmer need only be aware of the syntax and data required for performing a particular management function. Detailed knowledge of the particular data structure is not required. Thus, APIs are well suited for implementing operating system functions as programmers are relieved from learning the details of the operating system.

Figure 8:
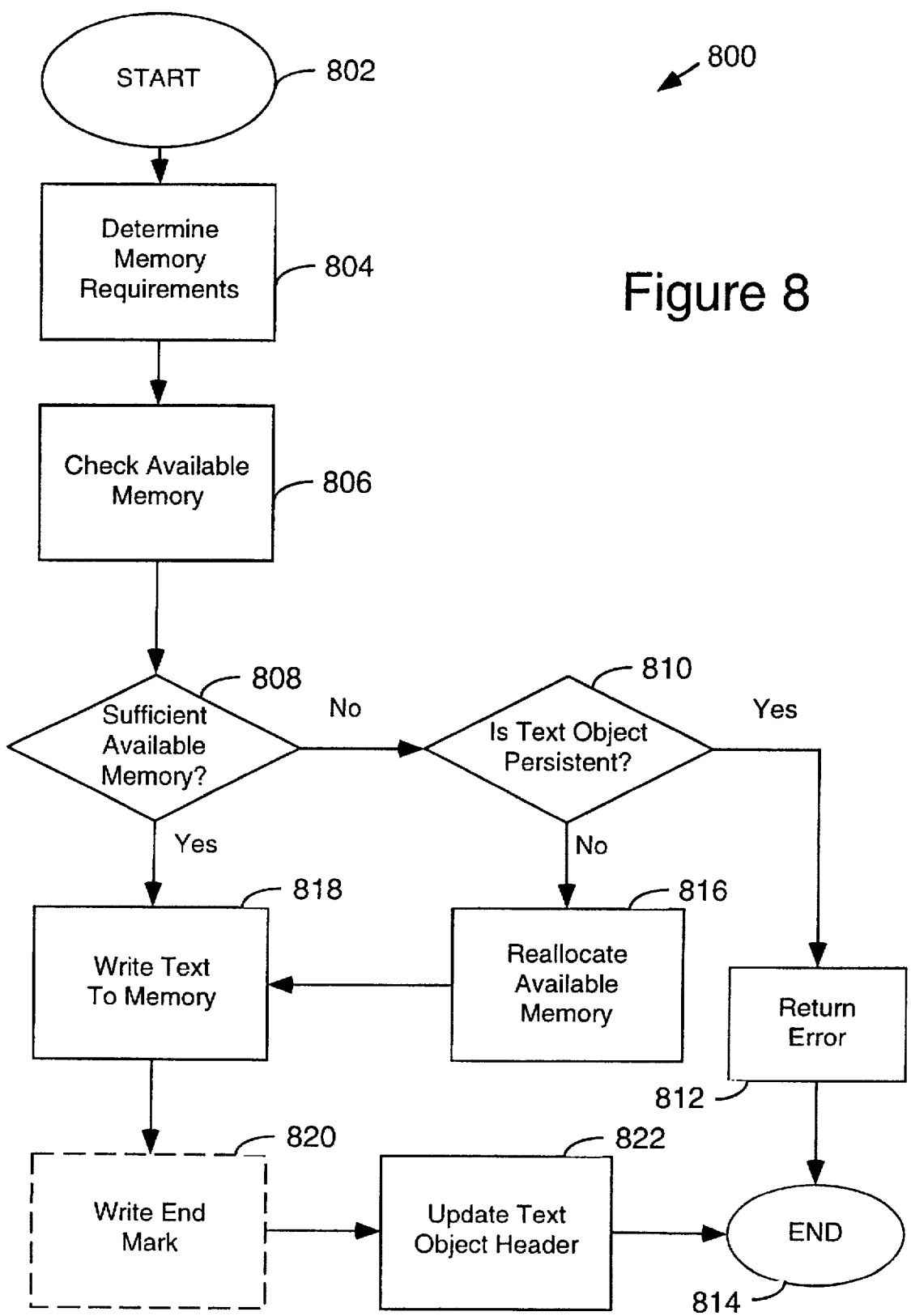
FIG. 8 is a flow diagram illustrating a method for installing text in a text object of the invention.

FIG. 8 illustrates a method for installing text in the text objects of the invention at 800. Starting at 802, the memory requirements for installing the text into the text object are first determined at step 804, and a check of the available memory in the system is made at step 806. A more detailed description of step 804 is provided in FIG. 10 below. At step 808 a determination is made as to whether the available memory is sufficient for creating the text object. If the available memory is not sufficient for creating the text object then, at step 810, the text object is queried to determine whether it is persistent. In one embodiment this is performed by checking the header flag described above in FIG. 5A at 506. If the object is determined to be persistent then, at step 812, an error is returned by the system and the sequence terminates at step 814.

If, however, the text object is not persistent, i.e., the object is an ephemeral text object, then the memory available to the text object is reallocated by the system to accommodate the memory requirements determined above at step 804. The text is then written to memory at step 818, which step 818 is described in greater detail in FIG. 9 below. An end marker may be written to the text object at step 820 if there is room available for the marker. Following the completion of writing the text to memory, the text object header is updated at step 822 to describe the new total size of the text object in addition to updating the run length, run type and encoding headers for the text run. The procedure then terminates at step 814 as described above.

Figure 9:
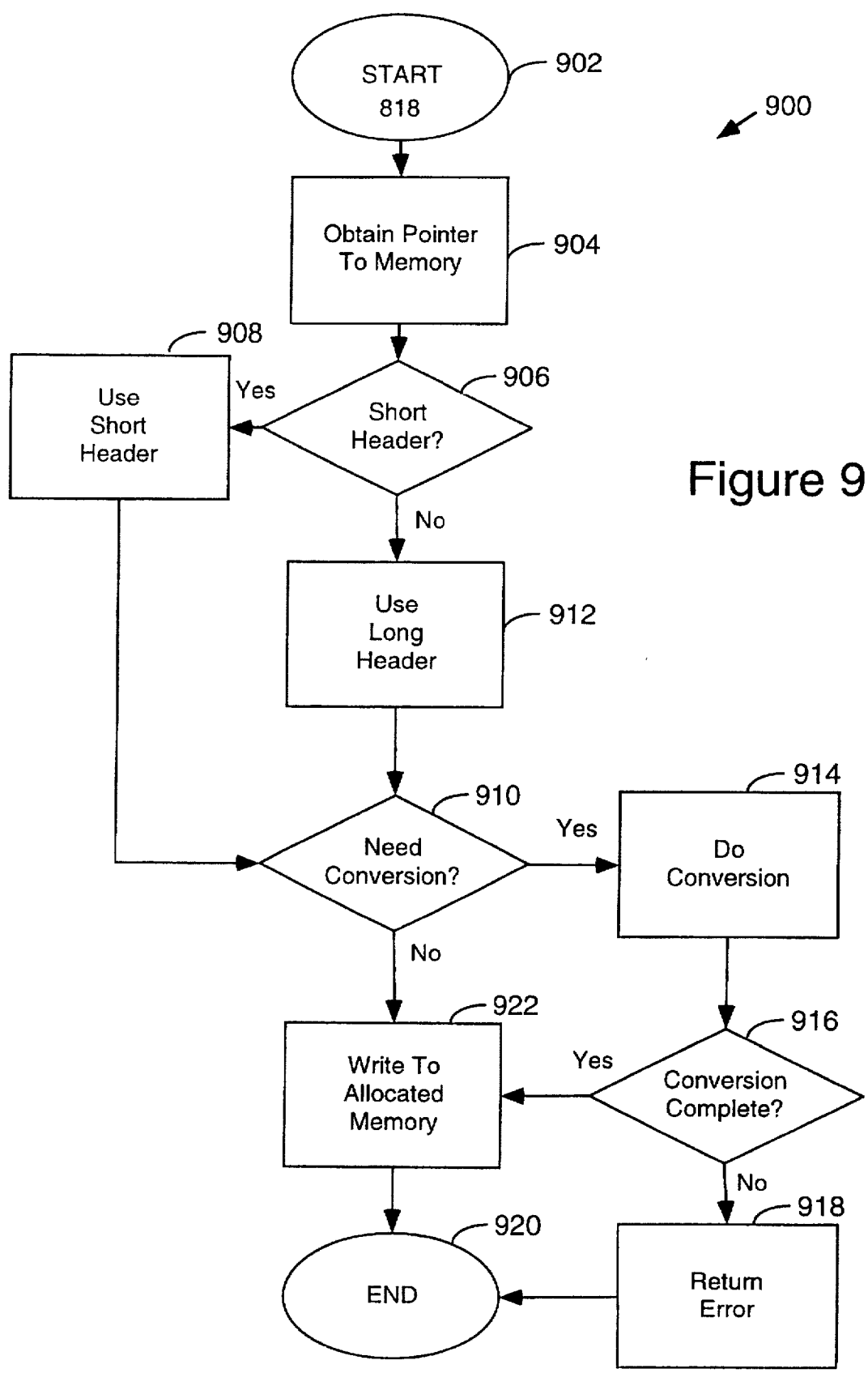
FIG. 9 is an illustration of step 818 of FIG. 8 in greater detail.

Step 818, the step of writing the text to the text object, is described in greater detail at 900 in FIG. 9. Beginning at step 902, an object pointer to the memory location at which the text is to be written is obtained from the system at step 904 and, at step 906, a determination is made as to whether the object can be written in the above-described short format. If a short header can be used, then at step 908 the short header format is applied and, at step 910, a determination is made as to whether a conversion of the text encoding is required. If a conversion is required then, at step 914, a conversion is performed. At step 916 a determination is made as to whether the conversion is complete. If the conversion is not complete then, at step 918, an error is returned by the system and the sequence terminates at step 920. However, if the conversion is complete then the text is written to memory at step 922. Step 922 is also reached when no conversion is determined to be required at step 910 above. If, at step 906, the short header cannot be used, then at step 912 the long header format is used and control moves to step 19 as described above.

Figure 10:
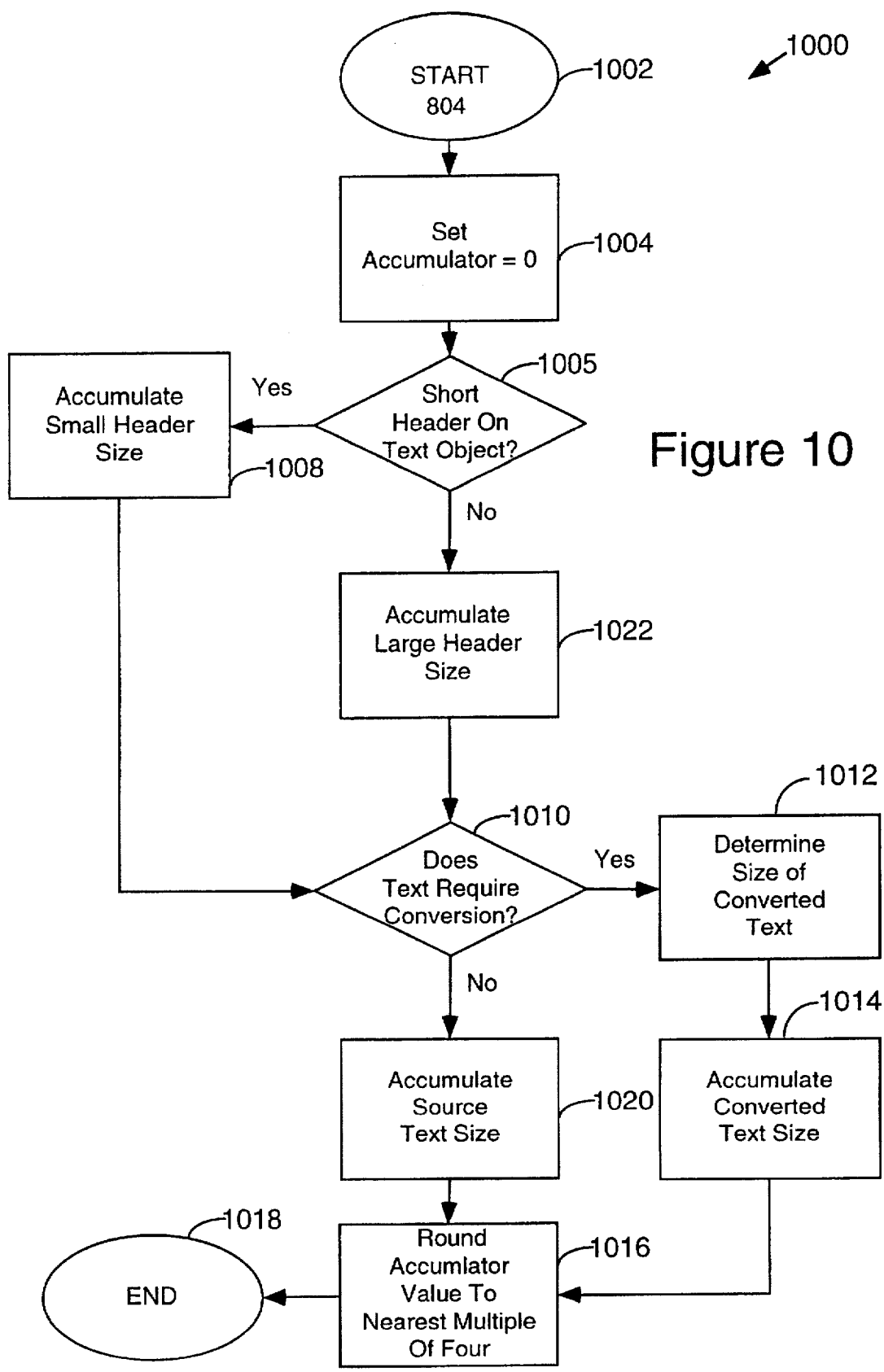
FIG. 10 is an illustration of step 804 of FIG. 8 in greater detail.

Step 804, in which the amount of memory required to store the text in the text object is determined, is described in greater detail at 1000 in FIG. 10. Beginning at step 1002, which corresponds to step 804 of FIG. 8, an accumulator is initialized to zero at step 1004. It will be appreciated that the accumulator of step 1004 is any mechanism useful for totaling the memory requirements as will be described in greater detail below. However, it will be appreciated that other methods of determining memory requirements may be employed without departing from the present invention. At step 1006 a determination is made as to whether the text object can employ a short header. If the object can be written using a short header, then, at step 1008, the small header size is accumulated and, at step 1010 a determination is made as to whether the text requires conversion. If the text requires conversion, then, at step 1012 the size of the converted text is determined and, at step 1014, the size of the converted text is also added to the accumulator. However, if the text is not determined to require conversion at step 1010, then, at step 1020, the size of the source text is accumulated. Alternatively, if at step 1006 a long header must be employed, then the large header size is accumulated at step 1022 and control flows to step 1010 which is described above. Following the accumulation of the total text size the value in the accumulator is rounded up to the nearest multiple of the data width of the text object. In one embodiment, as illustrated in FIG. 10, the width of the text object is four bytes and, therefore, the total value in the accumulator is rounded to the nearest multiple of four as measure in bytes. Following the rounding at step 1016 the procedure terminates at step 1018.

Figure 11:
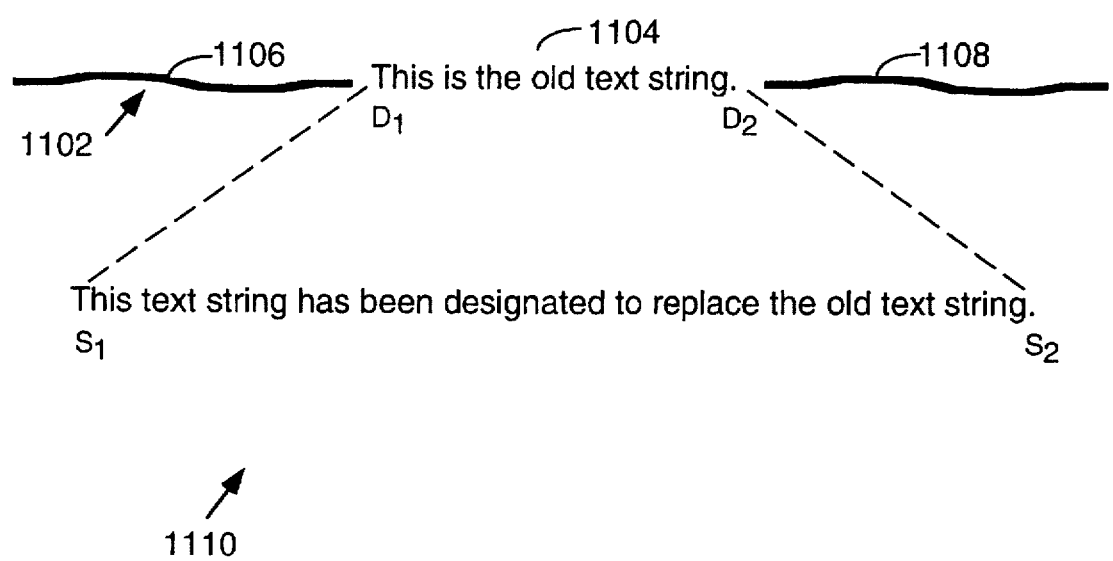
FIG. 11 is an illustration describing the replacement of an old text string in an existing text object with a new text string.

FIG. 11 illustrates a text replacement operation at 1100. As shown in the figure an existing text object describing a text is string shown generally at 1102. The string includes an old text string 1104 which is flanked by additional text 1106 and 1108 (shown as solid lines). The text string includes a destination starting pointer ($D_1$) and the destination ending pointer ($D_2$). The text string 1104 is to replaced by a new text string 1110 which has a source starting pointer $S_1$ and a source termination pointer $S_2$. The operations described below illustrate the replacement of destination string 1104 by source string 1110.

Figure 12:
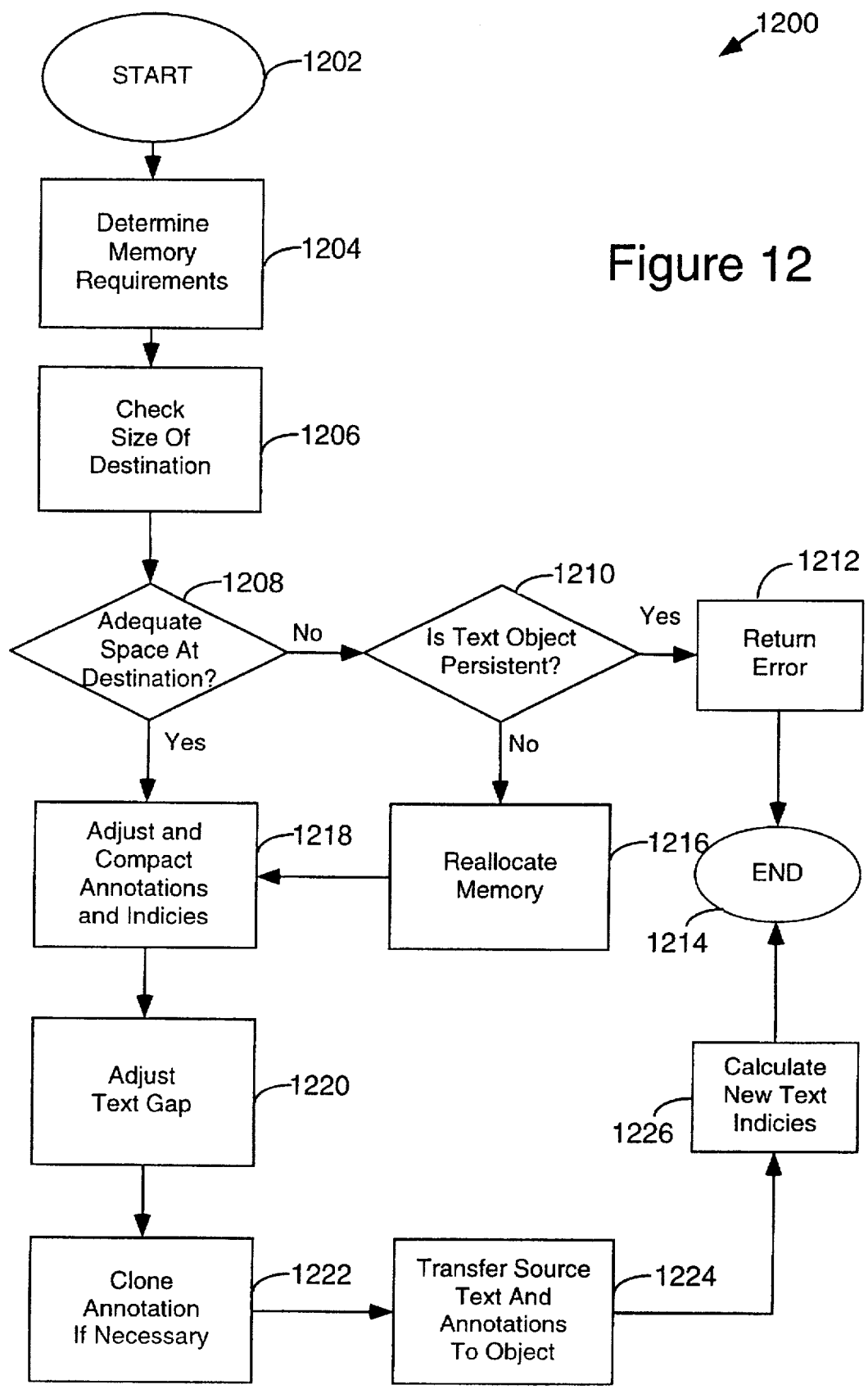
FIG. 12 is a flow chart illustrating a method for replacing text in a text object in the present invention.

The present invention further provides a method for replacing text in a text object as illustrated at 1200 in FIG. 12. Starting at step 1202, a determination of the required memory for performing the replacement operation is determined at step 1204, which step is described in greater detail with respect to FIG. 14 below. At step 1206 the available memory space at the destination for the replacement text string is determined and, at step 1208, the determination is made as to whether the amount of space available at the destination is adequate. If the space is determined not to be sufficient for the operation then, at step 1210, a determination is made as to whether the text object is persistent. If the text object is determined to be persistent then, at step 1212, a system error is returned and the procedure terminates at step 1214.

Conversely, if the text object is an ephemeral text object, then, at step 1216, the available memory space is reallocated by the system to accommodate the new text string and, at step 1218, the annotations are adjusted and compacted and the indices are adjusted at the target text object. Following step 1218, any text gap remaining in the text object following the replacement is adjusted at step 1220 and, at step 1222, any annotations needed to be cloned are cloned. In step 1222, annotations that cover completely the replaced range are split in process referred to herein as "cloning", in which the end index of the original is adjusted to beginning of the replaced range and a copy of the original annotation is made whose start index is the end of the replaced range and whose end index is the end index of the original annotation. At step 1224 the source text and annotations are transferred to the memory space of the text object and, at 1226, new text indices are calculated. The procedure terminates at step 1214.

Figure 13A:
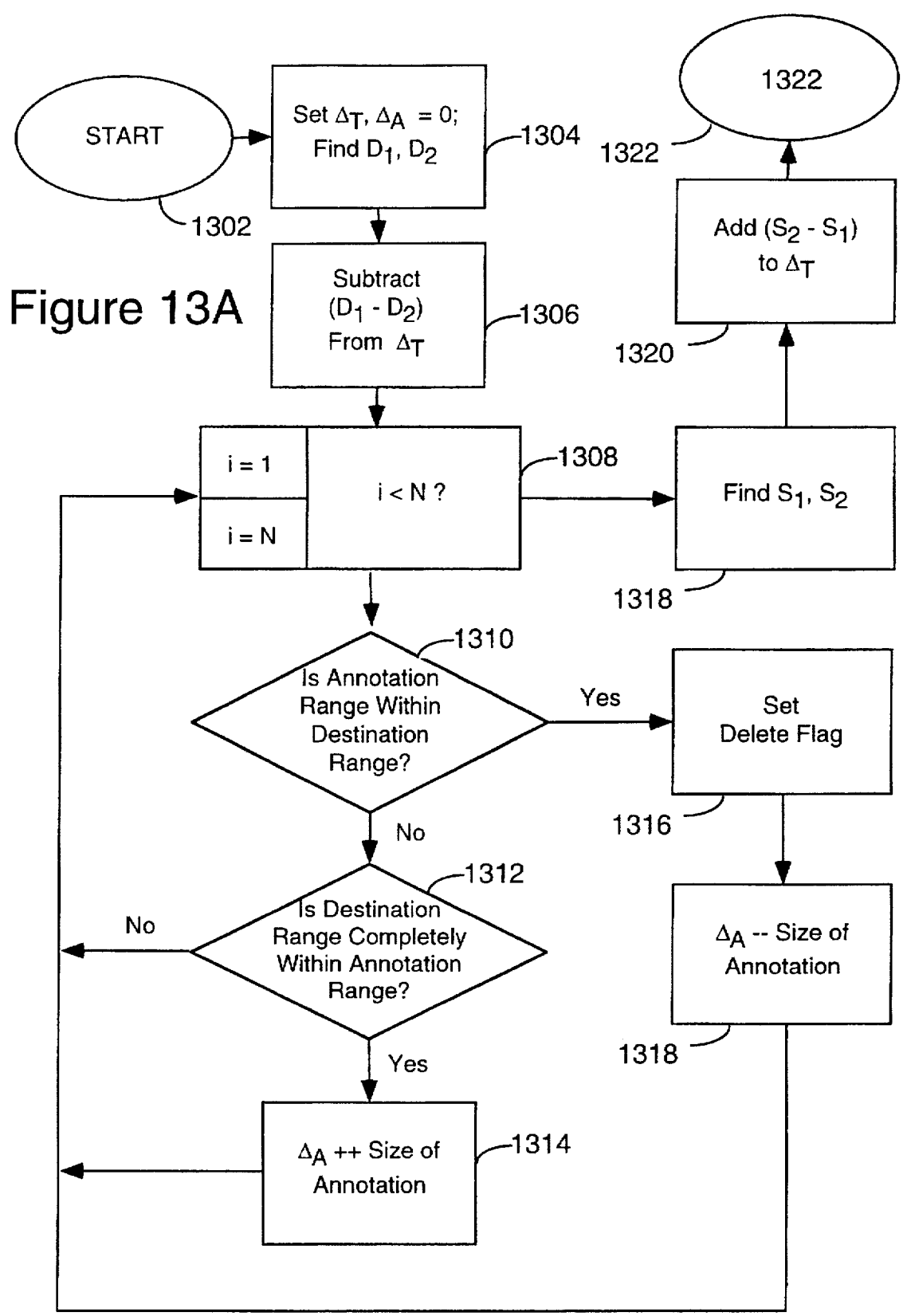
FIGS. 13A and 13B are flow diagrams illustrating step 1202 of FIG. 12 in greater detail.
Figure 13B:
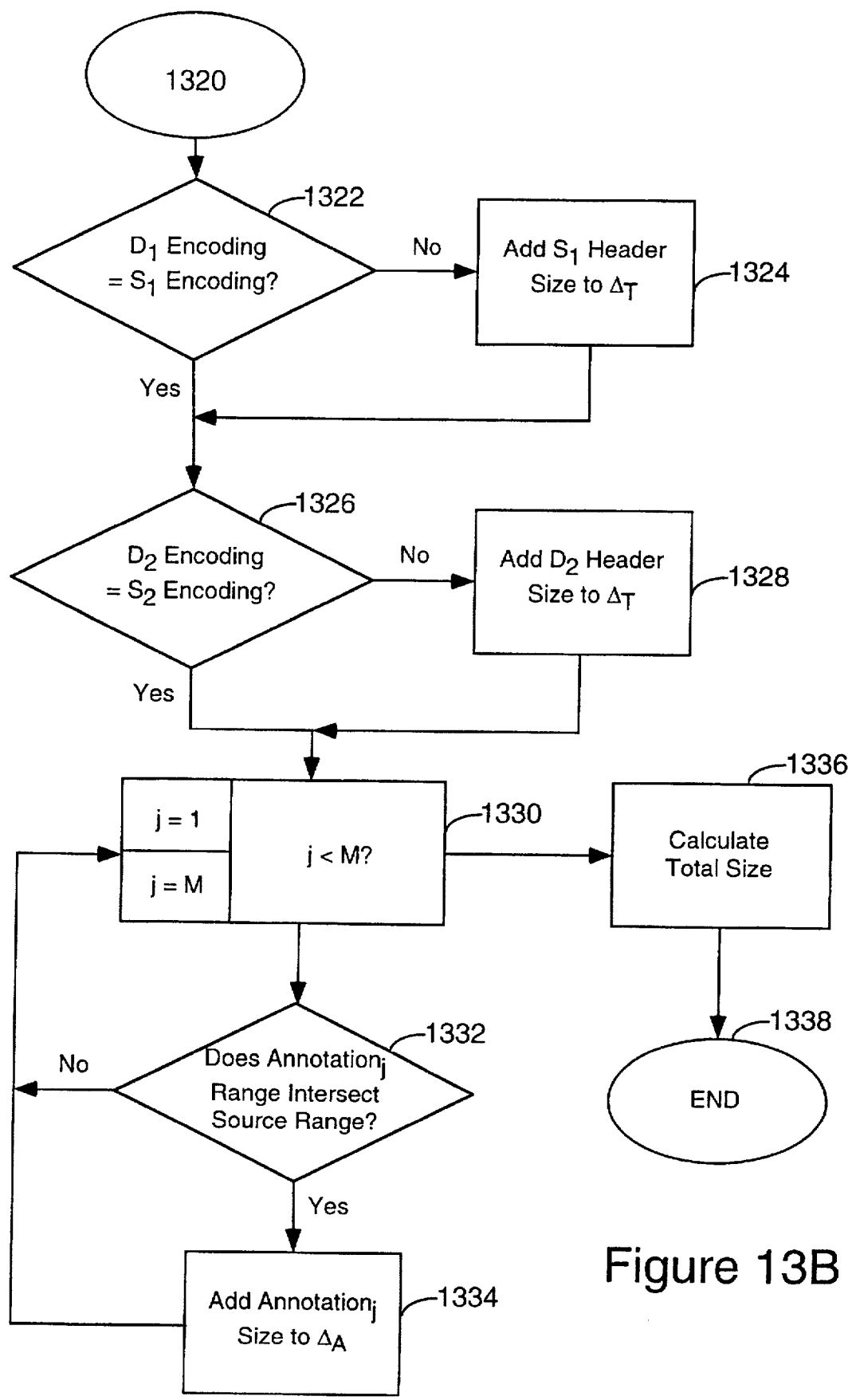

Step 1204, in which the memory requirements for the text transfer operation are determined is described in greater detail with respect to FIGS. 13A and 13B. Beginning at step 1302, the quantities $\Delta_T$ and $\Delta_A$ (the primary data portion and annotation portion sizes, respectively) are initialized to zero and the values of the pointers $D_1$ and $D_2$ are determined. At step 1306 the quantity $(D_1-D_2)$ is subtracted from $\Delta_T$ and, at step 1308, a loop is made over each of the annotations i (i=1, . . . , N) contained in the text object. It will be appreciated that the foregoing calculation of the quantities $\Delta_T$ and $\Delta_A$ may vary depending on the type of data structure used. For example, where a long-aligned data structure is employed (e.g., the data structure shown in FIG. 5A) appropriate adjustment for any padding may have to be included whereas no such adjustment is required for byte-aligned data structures (such as shown in FIG. 5B). Those of skill in the computer science and programming arts will be familiar with making such calculations and any appropriate adjustments.

Within loop 1306, at step 1310 a determination is made as to whether the current annotation range is within the destination range of the text to be removed. If the annotation range is not within the destination range, then a determination is made as to whether the destination range is completely within the annotation range. If an affirmative answer is returned, then, at step 1314, $\Delta_A$ is increased by the size of the annotation and the loop continues back to 1308. If at step 1310 the annotation range is determined to be within the destination range then, at 1316, a delete flag is set for the annotation and at step 1318 $\Delta_A$ is decreased by the memory size of the annotation. At step 1312 if the destination range determined is not to be completely within the annotation range then that annotation is skipped and the loop index is incremented.

Following the execution of loop 1306, the source pointers $S_1$ and $S_2$ are determined at step 1318 and the difference $(S_2-S_1)$ is added to $\Delta_T$. A determination is then made as to whether the encoding at position $D_1$ is the same the encoding as at $S_1$ at step 1322. If the encodings are different, then, at step 1324, the size of the header at $S_1$ is added to $\Delta_T$ and, at step 1326, a determination is made as to whether the encodings of $D_2$ and $S_2$ are the same. If the determination at step 1322 is that the encodings of $D_1$ and $S_1$ are identical, the flow moves directly to step 1326. In another embodiment, steps 1322 and 1324 are omitted (dashed box) and the calculation flows from step 1320 above directly through steps 1324 and 1328 (dashed lines) to step 1330.

If at step 1326 the encodings of $D_2$ and $S_2$ are different then, at step 1328, the size of the $D_2$ header is added to $\Delta_T$ and flow moves to the loop shown at step 1330. Similarly, the loop described at step 1330 is reached directly if the encodings at $D_2$ and $S_2$ are determined to be the same. The loop at 1330 includes a second calculation over each of the annotations in which at step 1322 a determination is made as to whether the $j^{th}$ annotation range (j=1, . . . , M) intersects the source range. If the annotation range for the $j^{th}$ annotation does intersect the source range then, at step 1334, the size of the $j^{th}$ annotation is added to $\Delta_A$ and the loop index is incremented. However, the loop index is incremented directly if the determination at step 1332 is negative. Following execution of the loop 1330 the total size is calculated at step 1336 and the procedure terminates at step 1338.

Figure 14:
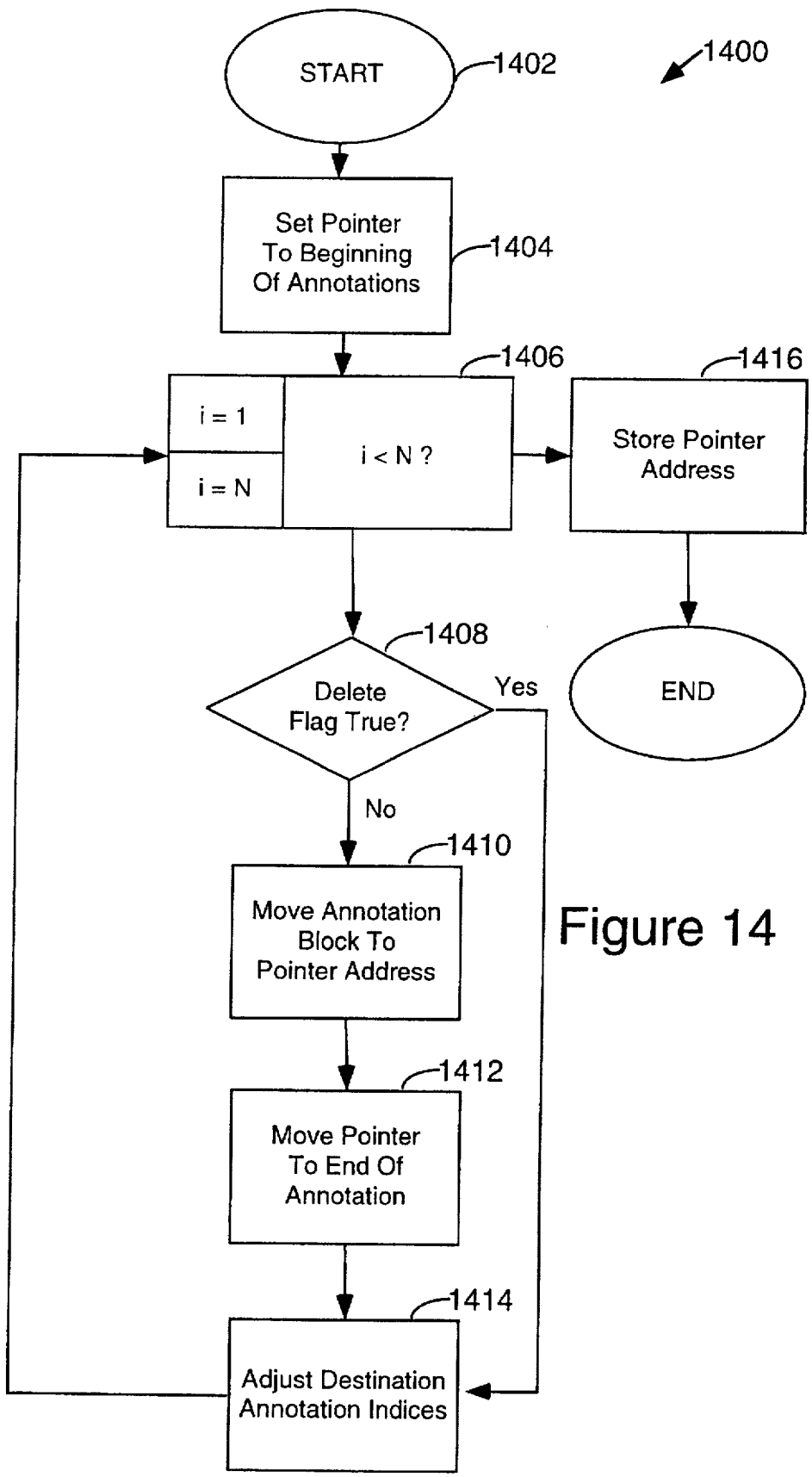
FIG. 14 is a flow diagram illustrating step 1218 of FIG. 12 in greater detail.

FIG. 14 is an illustration of step 1218 in greater detail. Beginning at step 1402, a pointer is set to the beginning of the annotations at step 1404 and, at step 1406, a loop is executed over which each of the annotations i (i=1, . . . , N) to determine which annotations, if any, can be deleted from the text object following the replacement of the text string. Thus, at step 1408 the $i^{th}$ annotation is checked to determine whether a delete flag has been set in the annotation. In one embodiment the delete flag is found by checking the header of the annotation as described above with respect to FIG. 5.

If the delete is not set, then control moves to at step 1410 the annotation is then moved to the pointers address and the pointer is moved to the end of the annotation address. Thus, it will be appreciated that the above sets, steps 1410 and 1412, describe a "percolation" of the pointer through the annotations of the text object. However, it will be appreciated by those of skill in the art that other methods for examining the annotations are applicable to the present invention. At step 1414, the annotation indices of the destination annotation are adjusted and the loop is incremented at step 1406. If the delete flag is set, then control moves directly to step 1414. Following the completion of loop 1406, at step 1416 the pointer address is stored and the procedure terminates at step 1418.

Figure 15:
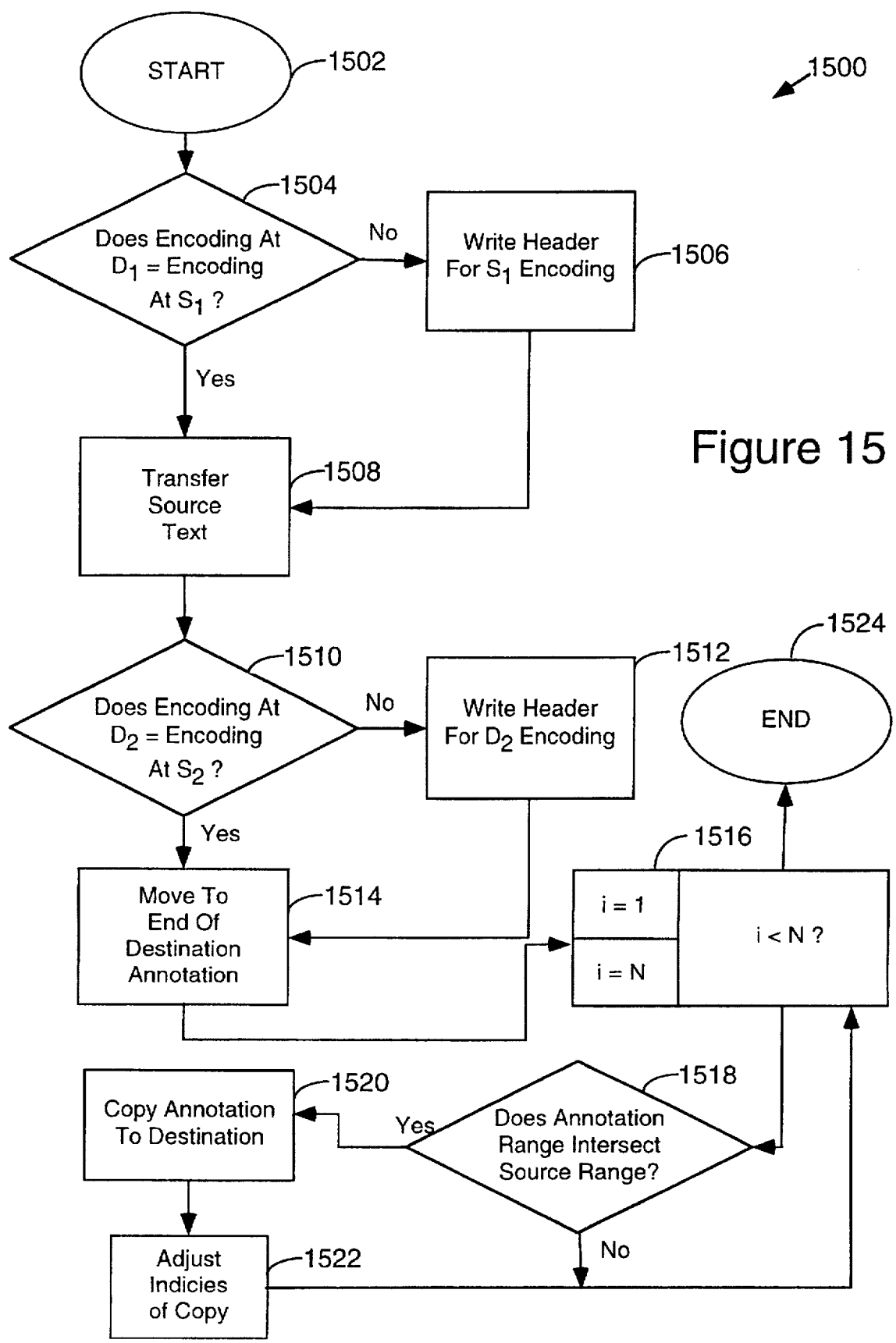
FIG. 15 is a flow diagram illustrating step 1224 in FIG. 12 in greater detail.

FIG. 15 describes the text transfer operation of step 1224 of FIG. 12 in greater detail at 1500. Starting at step 1502, a determination is made at step 1504 as to whether the encoding at $D_1$ is the same as the encoding at $S_1$. If the encodings are different then the header for the $S_1$ encoding is written to the memory location at $D_1$ and at step 1508 the source text is transferred. Similarly, at step 1510 a determination is made as to whether the encoding at $D_2$ is the same as the encoding at $S_2$. If the answer at query 1510 is negative, then the header for the $D_2$ encoding is written out to the destination text string and at step 1514 the pointer is moved to the end of the destination annotation. If the determination in step 1504 is that the $D_1$ and $S_1$ encodings are the same then the source text is transferred directly at step 1508. In an alternate embodiment, the steps at 1504 and 1510 are omitted and the flow of operation goes directly from 1502 to 1506 and from 1508 to 1512 (dashed lines).

At step 1516 a loop over the annotations i (i=1, . . . , N) is performed. Within the loop, at step 1518 a determination is made as to whether the $i^{th}$ annotation range intersects the source range. If there is an intersection then, at step 1520, the annotation is copied and the indices of the $i^{th}$ annotation are adjusted at step 1522. If, however, there is no intersection between the annotation range and the source range then the loop index is incremented directly. Following execution of the loop 1516, the procedure terminates at step 1524.

In another aspect, the present invention provides a method for extracting text from the text string in a text object. The text to be extracted can be contained in a single text run, or one or more disjoint text runs. As used with respect to FIGS. 16A and 16B, which describe the method of text extraction of the invention, the pointer to the beginning of the text to be extracted will be referred to as $S_1$ and the pointer at the end of the text to be extracted, which text may or may not be contiguous with the text at pointer $S_1$, will be referred to herein as $S_2$. Beginning at step 1602 in FIG. 16A, an accumulator is initialized at step 1604 and, and step 1606, $S_1$ and $S_2$ are determined and a result index is initialized to the value of $S_1$.

At step 1608 a loop is initialized over the i (i=1, . . . , N) text runs ($R_i$) be extracted. If a data structure including locale information, such as shown in FIG. 5B above, is used, then at step 1609 (dashed diamond) a determination is made as to whether the $R_i$ localeID matches the desired localeID. If the answer is no, a status flag is set at step 1618 (see dashed line and oval); otherwise flow moves to step 1610. At step 1610 a determination is made as to whether the encoding at the $i^{th}$ run $R_i$ matches the desired encoding, i.e. the encoding of the text adjacent $R_i$. If the encoding is different, then at step 1612 the text to be transferred is translated and, at step 1614, a determination is made as to whether all of the text has been translated. If less than all the text has been translated then, at step 1616, a status flag is set and, at step 1618, the size of the translated text is determined. Alternatively, if the answer at step 1614 is that all of the text is translated then, at step 1620, the size of the text to be extracted is compared with the buffer size available to perform the extraction. Additionally, if at step 1610 the encoding at the ith range matches the desired encoding then control moves directly to step 1620 as just described.

Regardless of whether the control of the procedure moves through step 1618 or step 1620, at step 1622 a determination is made as to whether the buffer is large enough to handle transferred text. If the buffer is not large enough then, at step 1624, the amount of text to be transferred is reduced to match the available buffer size, and, at step 1626, the text is appended to the buffer. It will be appreciated however, that another embodiment may be performed in which the buffer size is scaled to match the available text size thus obviating step 1624.

Figure 16A:
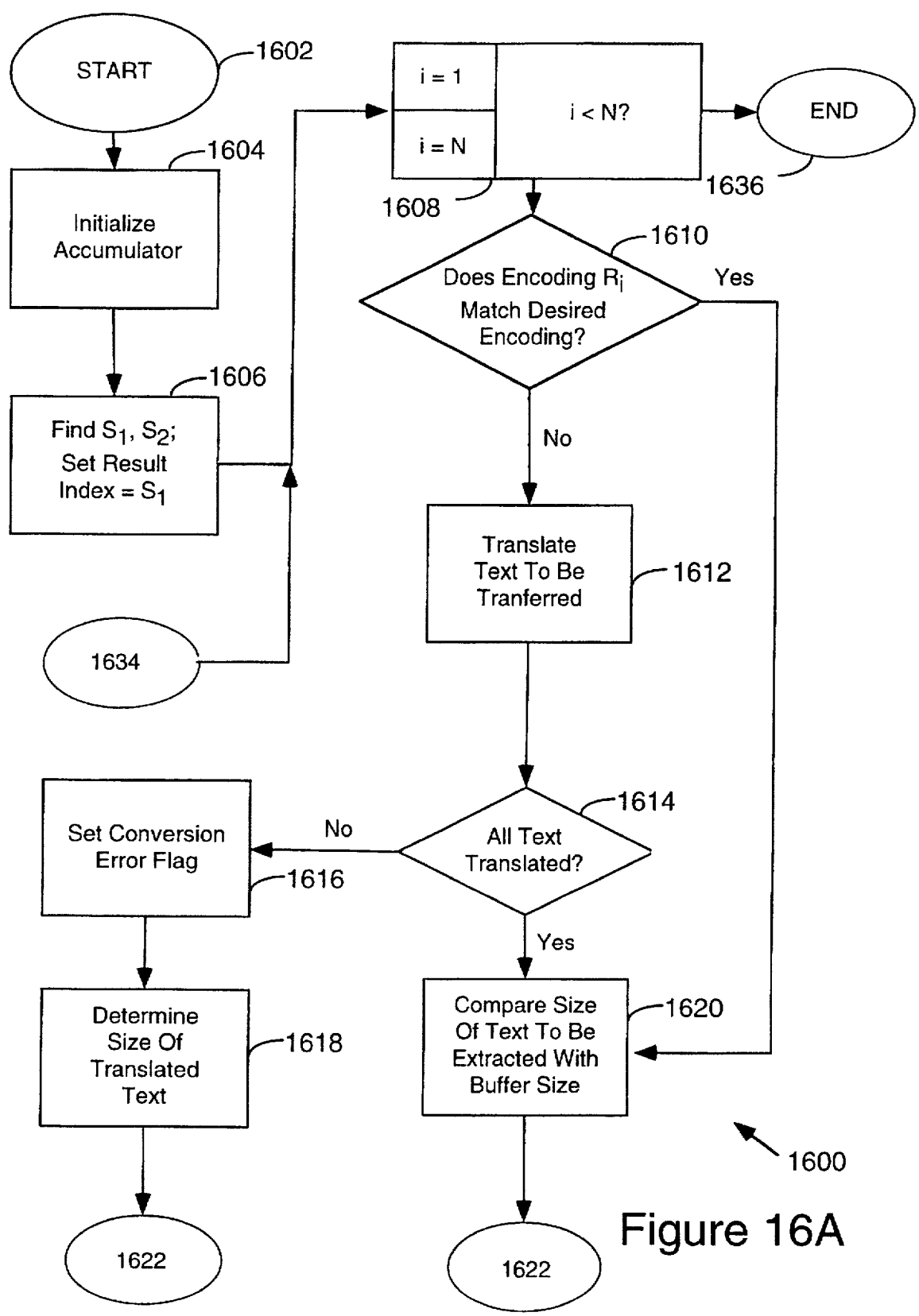
FIGS. 16A and 16B are flow diagrams illustrating a method of extracting text from a text object of the present invention.
Figure 16B:
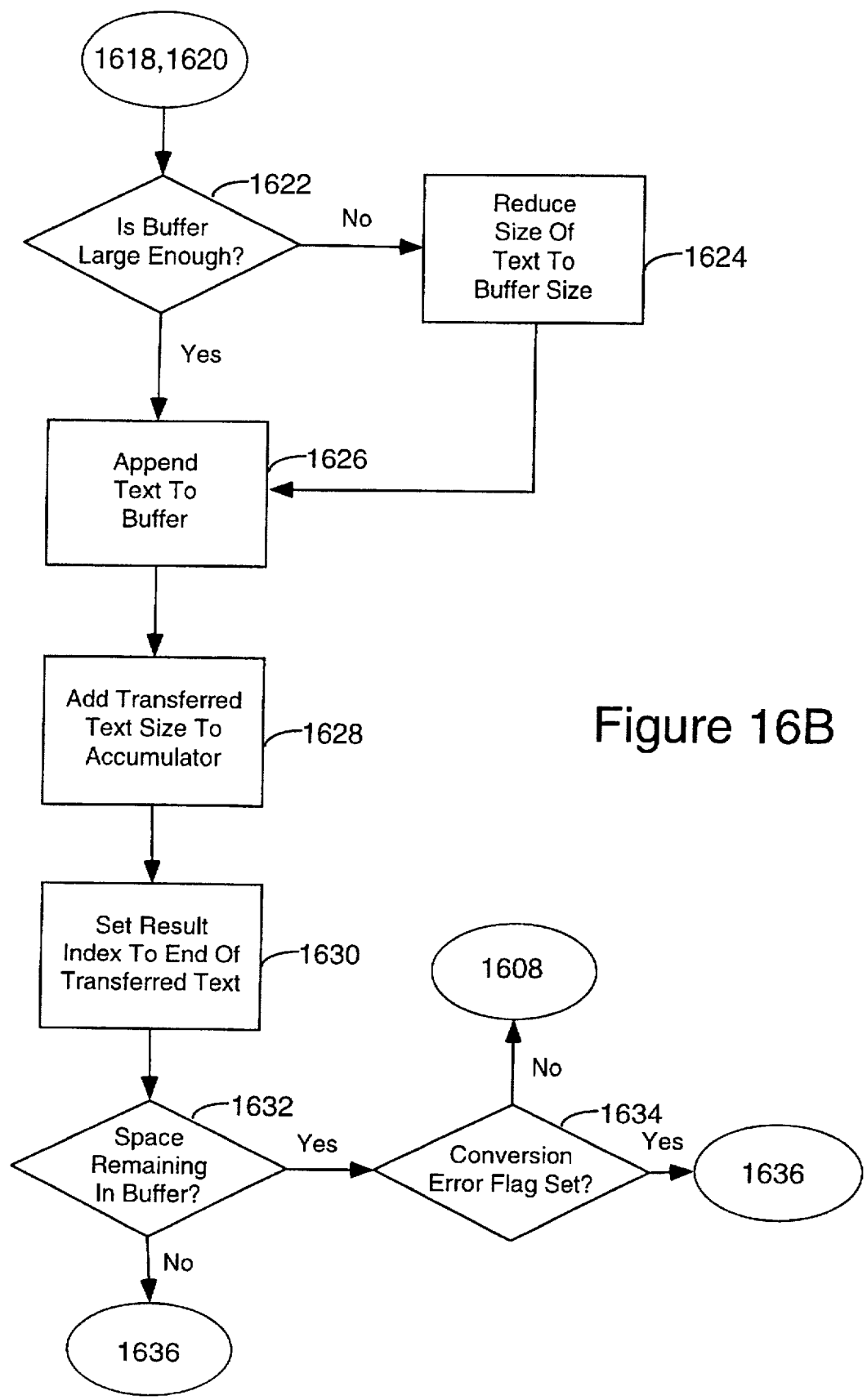

At step 1628 the size of the transferred text is then transferred to the accumulator and, at step 1630, the result index (i.e. the pointer to the address to the beginning of the text to be extracted) is set to the memory location of the end of the transferred text. Following step 1630, at step 1632 a determination is made as to whether there is space remaining in the buffer. If no space remains then control transfer to 1634 which causes termination of the procedure, and is found in FIG. 16A. If space remains in the buffer then at step 1634 a determination is made as to whether the conversion error flag was set back at step 1616 in FIG. 16A. If the flag is set then the control transfers to step 1636 of FIG. 16A and the procedure terminates. If the error flag has not been set then, control returns to step 1608 as shown in FIG. 16A above.

In another aspect, the present invention includes a text copy routine allowing text to be copied from one text object to an interim buffer from which the text can be pasted into another memory location. According to this aspect of the invention, first a memory location is allocated for a new text object and the Replace operation described above with respect to FIG. 11 is performed.

In another aspect, a Normalize procedure is available to normalize text being copied to a new object, i.e., encode the text in predetermined format. This procedure is substantially identical to the procedure described above with respect to FIGS. 13A and 13B, with the exception at steps 1314–1318 and step 1324 are omitted. Thus, the method of copying text from a text object is substantially identical to the method for extracting a text as described above, with the exception that the determination of the buffer capacity is omitted.

Figure 17:
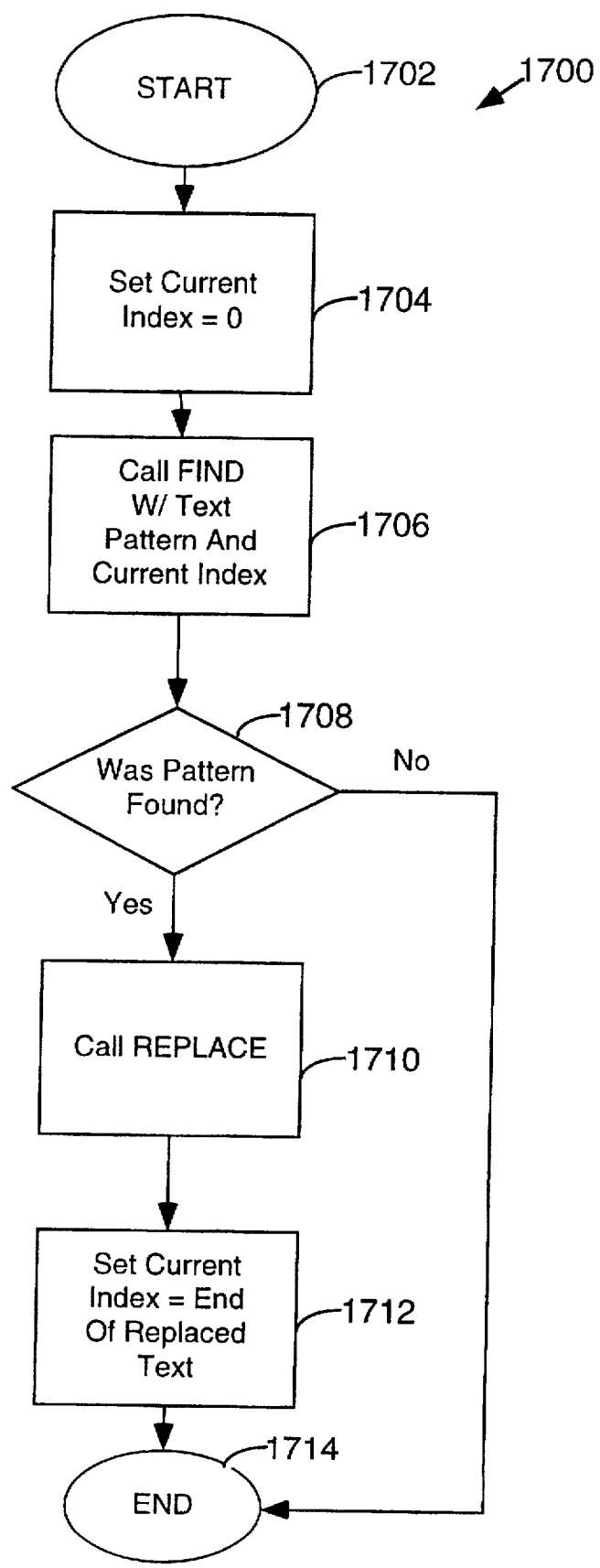
FIG. 17 is a flow diagram illustrating a method for substituting one text string for another in a text object of the present invention.

In still another aspect the present invention includes a method for finding text within a text object as described at 1700 in FIG. 17. Beginning at step 1702 the current index, a marker which functions to denote text position, is initialized to zero. It will be appreciated that the current index functions by analogy to a pointer, but the current index is not a pointer it is an index variable that can be related to a pointer to a specific location within the text of the text object. Following the initialization of the current index at step 1704, at step 1706 a call is made to a find routine with the text pattern to be searched and the value of the current index. This routine is described in greater detail in FIG. 18 below. At step 1708 a determination is made as to whether the text pattern being searched has been found by the found routine. If the pattern isn't found then the procedure terminates at step 1714. Otherwise, the replace routine is called to insert the replacement string within the text object and remove the string to be replaced. This routine is described in greater detail with respect to FIG. 19 below. At step 1712 the current index is then set to the end of the replaced text and the procedure terminates at step 1714.

Figure 18:
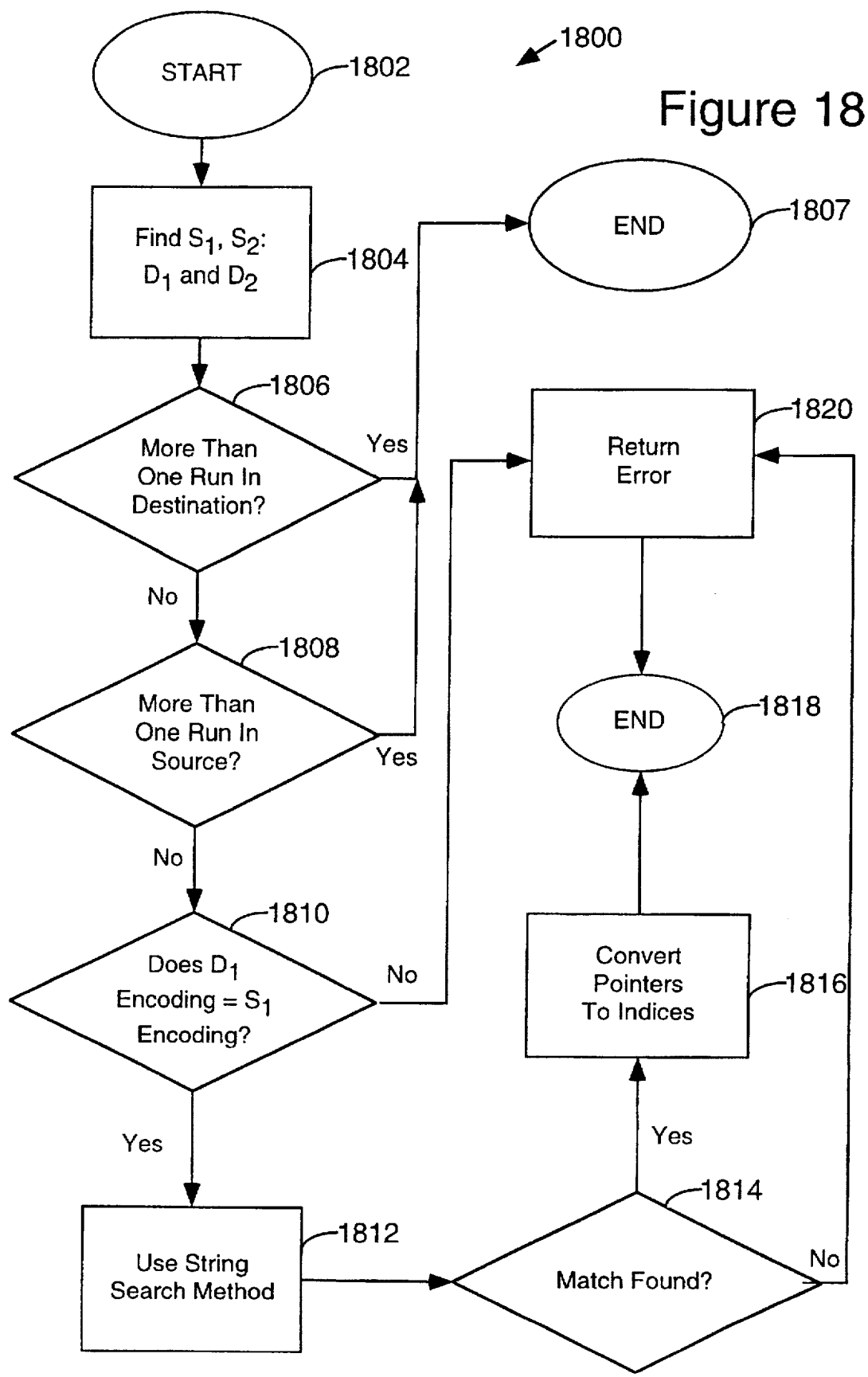
FIG. 18 is a flow diagram illustrating a method for finding a text string in a text object of the present invention.
Figure 19:
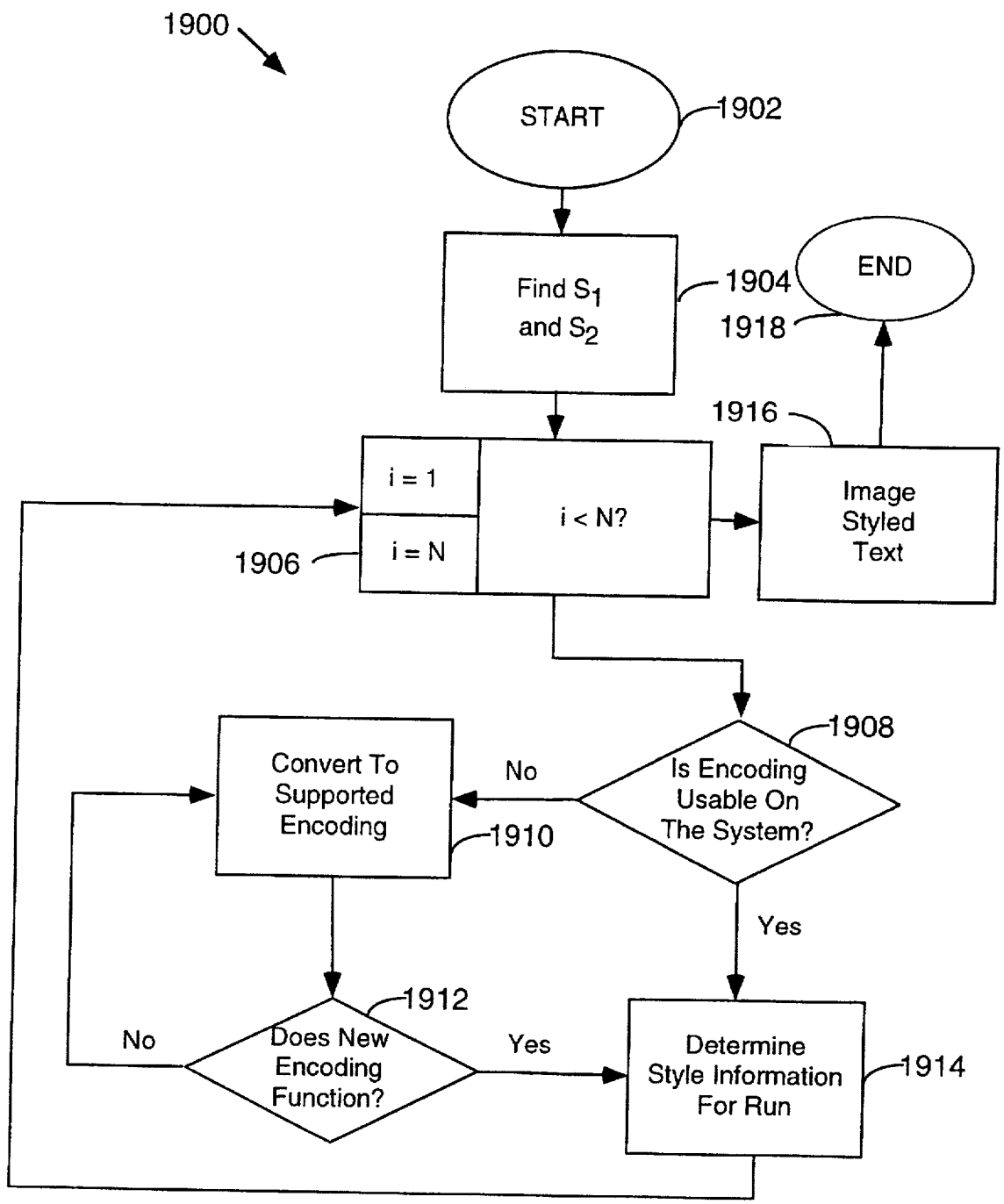
FIG. 19 is flow diagram illustrating a method for imaging text contained in a text object of the present invention.

The find routine called at step 1706 is described in greater detail at 1800 in FIG. 18. In one embodiment the find routine functions to locate a desired string of text within a single run of text in the text object. However, those of skill in the art will appreciate that this may be extended to locate text across one or more runs within a text object using known techniques.

Starting at step 1802 $S_1$, $S_2$, $D_1$ and $D_2$ are determined at step 1804. As used with respect to the discussion of FIG. 18, $S_1$ and $S_2$ are the pointers to the beginning and end of the source string, i.e. the string to being used as the replacement string, and $D_1$ and $D_2$ are the pointers to the beginning and end respectively of the string to be replaced. Thus, it will be recognized that $S_1$, $S_2$, $D_1$ and $D_2$ have definitions analogous to those described above with respect to FIG. 11.

Following the determination of $S_1$, $S_2$, $D_1$ and $D_2$ at step 1804, a determination is made as to whether more than one run is identified in the destination at 1806. If the answer at 1806 is affirmative, then the program terminates at step 1807. However, if only one run is identified in the destination, then, at step 1808, a determination is made as to whether there is more than one identified in the source. If the answer to 1808 is affirmative then the program terminates at step 1807 as just described. Alternatively, if only one run exists at both the destination and source then, at step 1810, a determination is made as to whether the encoding at $D_1$ is equivalent to the encoding at $S_1$. If the encodings are the same, then a string search is performed using any one of the many techniques known to those of skill in the art for searching text. Alternatively, step 1810 can be omitted and the program flow move directly from step 1808 to step 1812 (dashed line). At step 1814 a determination is made as to whether a match has been found within the text in the destination text run. If a match is found then, at step 1816, the pointers are converted to indices using standard methods and the procedure terminates at step 1818. Alternatively, if no match is found an error is returned at step 1820 and the procedure terminates at step 1818. Similarly, referring back to step 1810, in which the encoding of $D_1$ and $S_1$ are compared, if the encoding of $D_1$ is different from the encoding of $S_1$ an error is also returned to the user at step 1820 and the procedure terminates at step 1818.

Present invention also provides a method for imaging a text contained in a text object. In one embodiment, the imaging of text is performed to provide a display of the text contained in the text string to the user. In a preferred embodiment, the imaging is performed using QuickDraw which is described in *Inside Macintosh: Imaging* (Addison Wesley 1993) and *Inside Macintosh: Text* (Addison Wesley 1993) both of which are incorporated herein by reference. However, those having skill in the art will appreciate that the text objects of the invention can be used in conjunction with other imaging systems or similar methods.

Beginning at step 1902 $S_1$ and $S_2$, again defined as above, are determined at step 1904. At step 1906 a loop is entered over the runs i (i=1, . . . , N) spanned by $S_1$ and $S_2$. Within the loop, at step 1908 a determination is made as to whether the encoding of the $i^{th}$ run is usable on the imaging system. If the answer at 1908 is negative then, at step 1910, the run is converted to an encoding that is supported by the system and, at step 1912, a determination is made to whether the new encoding functions with the imaging system. If the answer to step 1912 is negative then another encoding that is supported by the system is tried at step 1910 and the loop repeats at step 1912. In one embodiment, this loop is repeated until all of the encoding supported by the system have been attempted. If no supported encoding functions then the programs terminates at step 1918. If however, the new encoding does function at step 1912, or the original encoding is usable by the imaging system as determined at step 1908, then at step 1914 the style information for the run to be imaged is determined and the loop index i is incremented to the next run to be imaged. Following the determination of the style information for all of the runs the style text is imaged using standard procedures at step 1916 and the procedure terminates at step 1918.

The present invention further includes methods for computing the imaging operation, but not actually implementing the image process at step 1816 and an additional process, specific to the Macintosh® in which the text contained in the text object is forwarded to the Macintosh TextEdit facility, which is described in *Inside Macintosh: Macintosh Toolbox Essentials* (Addison Wesley 1993), previously incorporated herein by reference. In the former method, steps 1902–1918 are performed as described above, with the exception that step 1916, the actual imaging of the style text, is omitted. Similarly, with respect to the latter method, the steps 1902–1918 are performed, with the exception that at step 1916 the text is not imaged, but rather the styled text is installed directly into the TERec location which will be familiar to those skilled in the art of programming computers running Macintosh® operating system.

Figure 20A:
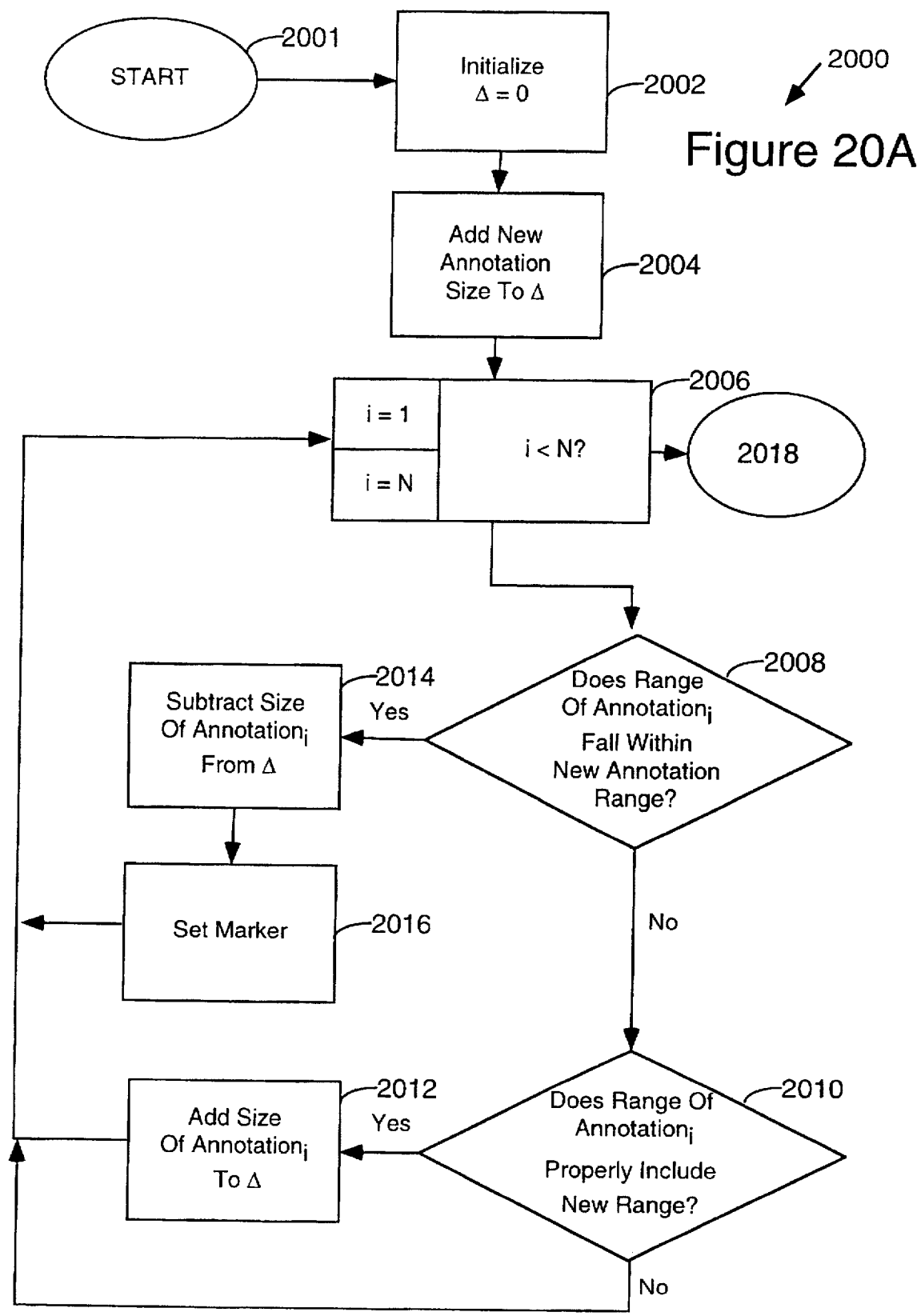
FIGS. 20A and 20B are flow diagrams illustrating a method for creating annotations in accordance with the present invention.
Figure 20B:
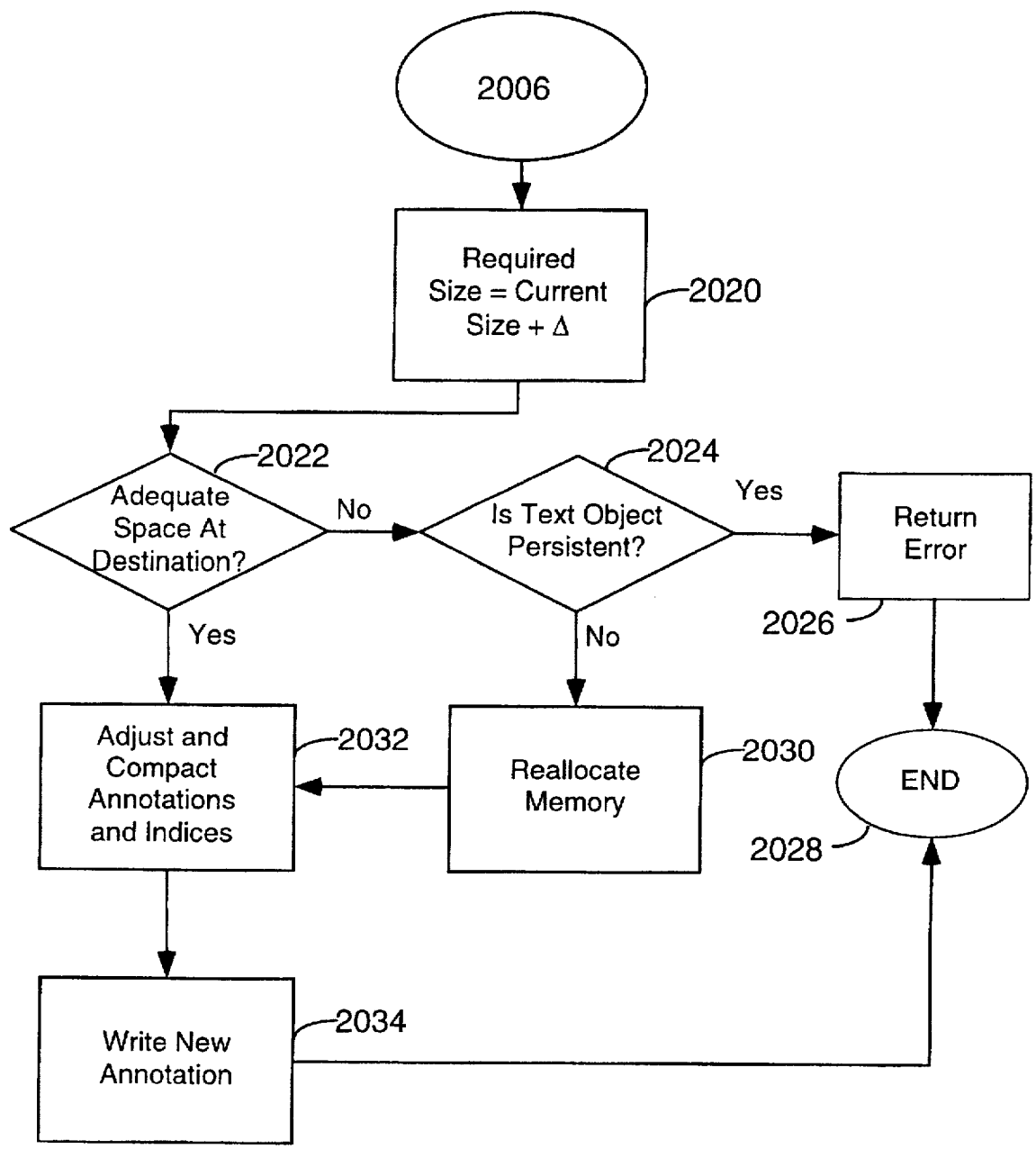

In still another aspect, the present invention includes methods for the creation and deletion of the above-described annotations within a text object that may contain additional annotations. As shown in FIG. 20A at 2000, a method for the creation of annotations is presented. Beginning at step 2001 a parameter Δ is initialized to zero at step 2002 and, at step 2004, the size of a new annotation is added to Δ. Next, beginning at step 2006, all of the i annotations (i=1..., N) of the text object are examined to make a final determination of Δ. Within loop 2006, at step 2008 a determination is made as to whether the range of the $i^{th}$ annotation falls within the range of the new annotation. If the answer at 2008 is negative, then, at step 2010, a determination is made as to whether the range of the $i^{th}$ annotation properly includes the new range. As used herein the term "properly include" means that the range of the $i^{th}$ annotation completely encloses the range of the new annotation, exclusive of the situation where the two ranges overlap exactly. Thus, it will be appreciated that at step 2010 the range of the $i^{th}$ annotation must completely encompass the range of the new annotation with additional space both above and below the range of the new annotation. If the answer at step 2010 is affirmative, then the size of the $i^{th}$ annotation is added to Δ; otherwise, the loop index is incremented at step 2006. Similarly, if at step 2008 it is determined that the range of the $i^{th}$ annotation falls within the range of the new annotation then at step 2014 the size of the $i^{th}$ annotation is subtracted from Δ and, at step 2016, a marker for the annotation is set. In one embodiment the marker is that described above with respect to FIG. 5.

Following execution of the loop 2006, at step 2020 the required size for the new annotation is determined to be the current size being used by the annotation plus Δ. It will be appreciated that depending on the size of any annotations that are subtracted that Δ can be either positive or negative and thus the required size may be more or less than the current size. In step 2022 a determination is made as to whether adequate space exists at the destination of the new annotation. If adequate space does not exist then a determination is made as to whether the text object is a persistent text object at step 2024. If the object is a persistent object, then at step 2026 an error is returned and the process terminates at step 2028. Otherwise at step 2030 the memory is reallocated, as the object has been determined to be an ephemeral object, and the existing annotations are adjusted and compacted and their indices are adjusted at step 2032. Similarly, if adequate memory space is determined to exist at step 2022 the program control moves directly to step 2032 as just described. Following step 2032 the new annotation is written and the process terminates at step 2028.

Figure 21A:
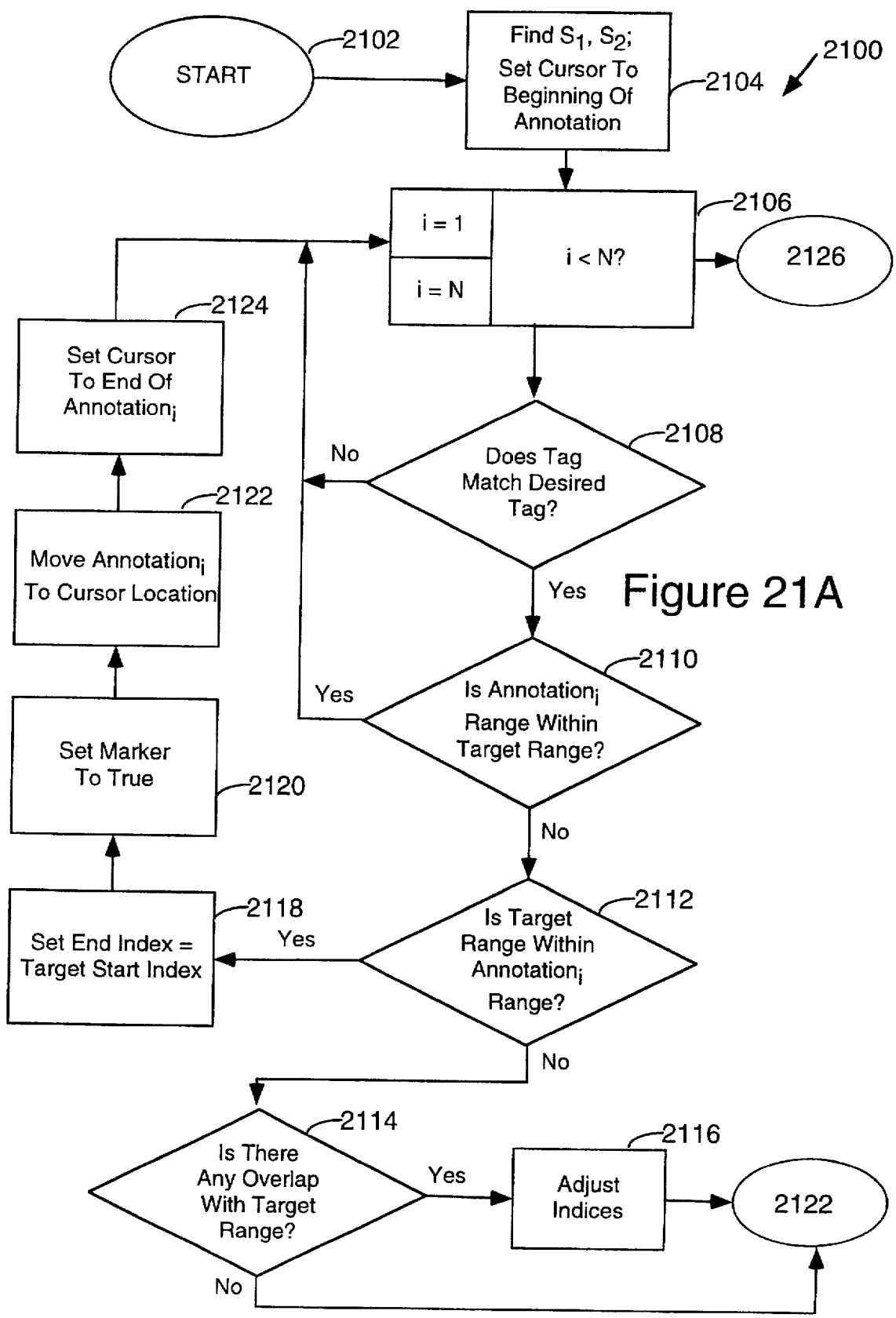
FIGS. 21A and 21B are flow diagrams illustrating a method for deleting annotations in accordance with the present invention.
Figure 21B:
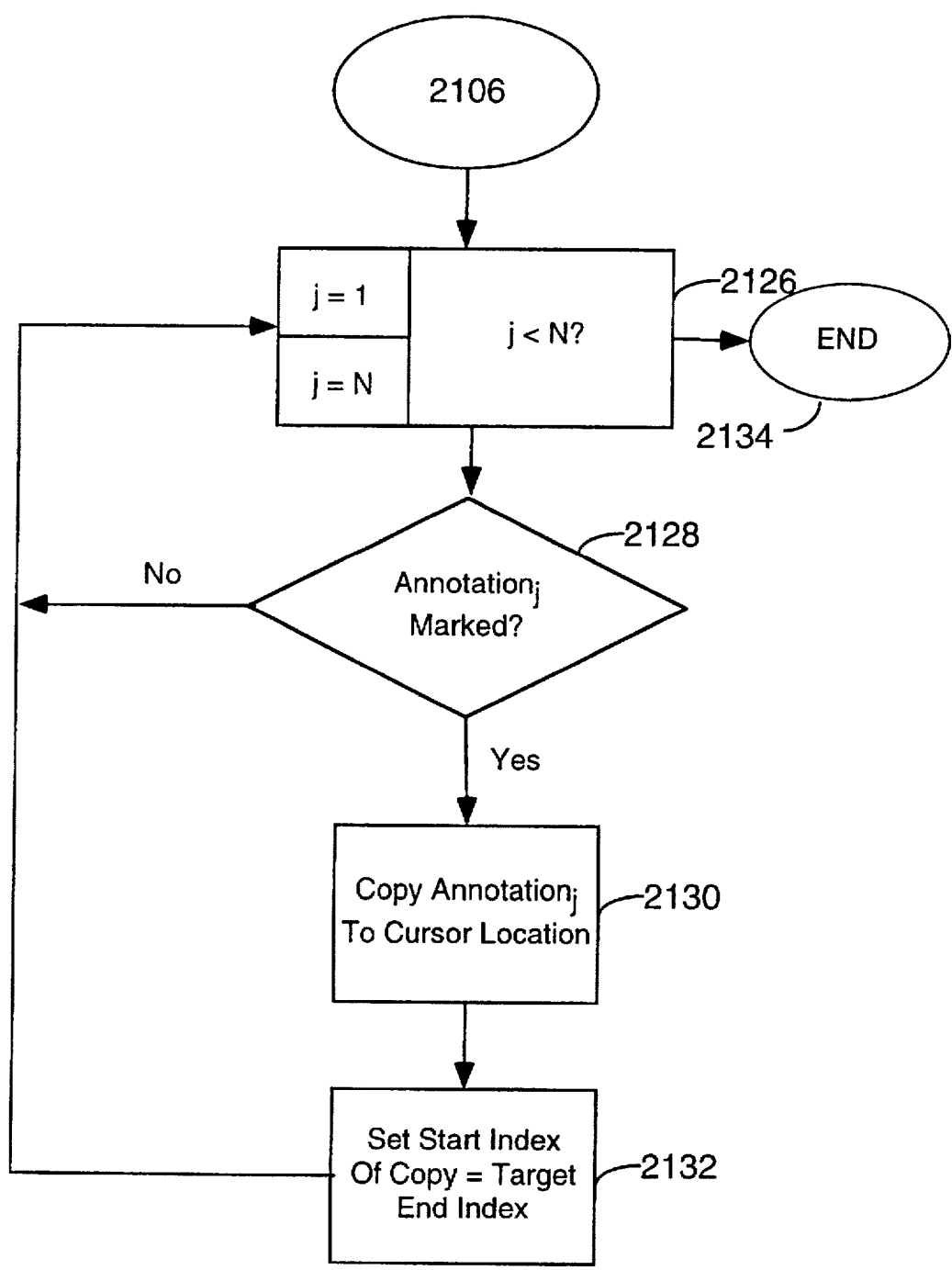

In yet another embodiment the present invention further includes a method for deleting annotations from text object containing one or more annotations. This method is described in FIGS. 21A and 21B. Beginning at step 2102, $S_1$ and $S_2$ are determined and a cursor is set to the beginning of the annotation to be deleted at step 2104. As used with respect to the present discussion, the term "cursor" will be taken to mean a device indicating the memory location of the annotation. Thus the cursor may be a pointer or it may be some other form of index which is effective to indicate the beginning of the annotation in the memory of the computer system.

At step 2106 each of the i annotations (i=1, ..., N) are examined to determine which annotations are to be deleted. At step 2108 a determination is made as to whether the tag present in the $i^{th}$ annotation matches the desired tag. If the tags do not match, then the loop at 2106 is incremented and step 2108 is repeated. If the answer at step 2108 is affirmative, then at step 2110 a determination is made as to whether the $i^{th}$ annotation range is within the target range. If the answer in step 2110 is affirmative, then the loop is then incremented and steps 2108 and 2110 are performed. If the answer in step 2110 is negative, then, at step 2112, a determination is made as to whether the target range is within the $i^{th}$ annotation range. If the answer at 2112 is negative, then, at step 2114, a determinations made as to whether any overlap exists between the $i^{th}$ annotation and target range. If the answer at 2114 is affirmative then at step 2116 the indices are adjusted and the flow of the procedure moves to step 2122 which is described below. Alternatively if the answer to step 2114 is negative the flow moves directly to step 2122.

If, however, at step 2112 the target range is within the $i^{th}$ annotation range, then at step 2118 the end index is set to the target start index and, at step 2120, the deletion marker is set to true. Following step 2120, or depending whether the program has moved through step 2114 as described above, the $i^{th}$ annotation is moved to the cursor location and, at step 2124, the cursor is moved to the end of the $i^{th}$ annotation at which point the loop index is incremented at step 2106. Thus, as discussed above it will be appreciated at the present invention provides a method in which the cursor "percolates" through the i annotations searching for those annotations to be deleted. It will be appreciated by those of skill in the art that other methods may be used for identifying and deleting the annotations.

Following execution of the loop at 2106, a second loop is executed at 2126 to cause deletion of the annotations. Within loop 2106, at step 2128 a determination is made as to whether the $j^{th}$ annotation has been marked above in loop 2106. If the annotation is not marked, then the loop index j is incremented at step 2126 and step 2128 is again repeated. If the answer at step 2128 is that the $j^{th}$ annotation is marked then, at step 2130, the $j^{th}$ annotation is copied to the cursor location and, at step 2132, the start index of the copied annotation is set equal to the target end index after which the loop is again incremented at 2126. Following completion of the loop the process terminates at step 2134. Thus, it will be appreciated that by performing the above-described marking and copying, only those annotations that are marked as being retained are kept. The remaining annotations are now no longer part of the text object and the memory locations assigned to those annotations is available for reuse using standard methods.

Thus it will be appreciated from the foregoing that the present invention provides a method and apparatus for creating and managing text objects that allows for superior text handling across different encoding schemes. Using the text objects of the invention, and the associated management techniques described herein, textual information for a computer operating systems can be manipulated more easily then presently available.

Although the foregoing invention has been described in some detail for purposes of clarity of understanding, it will be apparent that certain changes and modifications may be practiced within the scope of the appended claims.

What is claimed:

1. A computer-implemented method for creating a text object having a primary data portion and an annotation portion, said computer-implemented method comprising the steps of:
   providing a string of text characters,
   at least one run header containing a run length field providing the length of a substring within said string of text characters, and
   at least one attribute header containing a style definition characterizing a substring within said string of text characters;
   storing under computer control said string of text characters and said run header in said primary data portion; and
   storing under computer control said attribute header in said annotation portion;
   wherein said attribute header in said annotation portion includes information characterizing and describing a plurality of said text characters, and
   said run header in said primary data portion includes information characterizing and describing a plurality of said text characters and wherein
   said run header, said attribute header, and said text characters define at least one text run, said text ruin including a plurality of characters having the same encoding, thereby allowing an operating system of a computer system to convert data representing text of a first character set to data representing the text in a second character set.

2. The computer-implemented method of claim 1, wherein said step of providing at least one attribute header comprises defining a style for at least a portion of said text characters.

3. The computer-implemented method of claim 2, wherein said step of providing at least one attribute header further comprises defining a language for at least a portion of said text characters.

4. The computer-implemented method of claim 3, wherein said step of providing at least one attribute header further comprises providing a pronunciation for at least one character in said string of text characters.

5. The computer-implemented method of claim 2, wherein said portion of text characters is defined by the positions of the first and last text characters for which said style applies.

6. The computer-implemented method of claim 1, wherein said step of providing at least one run header comprises defining an encoding for at least a portion of said text characters.

7. The computer-implemented method of claim 6, wherein said portion of text characters is defined by the positions of the first and last text characters for which said encoding applies.

8. The computer-implemented method of claim 7, wherein said portion of text characters over which said style definition is applicable is different from said portion of text characters over which said encoding is to be applied.

9. The computer-implemented method of claim 7, wherein said portion of text characters over which said style definition is applicable is the same as said portion of text characters over which said encoding is to be applied.

10. The computer-implemented method of claim 6, wherein said step of providing at least one run header further comprises the step of providing a run length identifier and a run type identifier.

11. The computer-implemented method of claim 1, further comprising the step of providing a text object header including a total object size indicator and an object attribute indicator.

12. The computer-implemented method of claim 11, further comprising the step of identifying said text object as a permanent text object or a ephemeral text object in said object attribute indicator.

13. The computer-implemented method of claim 12, further including the step of providing a version identifier in said object attribute indicator.

14. The computer-implemented method of claim 1, wherein said annotation portion comprises an annotation header and said method further comprising the step of providing flags in said annotation header indicating
   a) whether said annotation portion is a long or short format; and
   b) whether any changes have been made to the region of text defined encompassed by said annotation portion.

15. The computer-implemented method of claim 1, further including the step of setting a normalization option flag in said text object.

16. The computer-implemented method of claim 1, further comprising the step of performing a computer-controlled text object management operation on said text object, said computer-controlled text object management operation being selected from the group consisting of creation operations, destruction operations, insertion operations and extraction operations.

17. A computer system for creating and managing a text object, said text object having a primary data portion and an annotation portion, said computer system comprising:
   a data input system for providing
      a string of text characters,
      at least one run header containing a run length field providing the length of a substring within said string of text characters, and
      at least one attribute header containing a style definition field characterizing a substring within said string of text characters;
   a storage mechanism for storing under computer control said string of text characters and said run header in a memory location of said computer system corresponding to said primary data portion; and
   a storage mechanism for storing under computer control said attribute header in a memory location of said computer system corresponding to said annotation portion;
   wherein said attribute header in said annotation portion includes information characterizing and describing a plurality of said text characters, and said run header in said primary data portion includes information characterizing and describing a plurality of said text characters, and wherein said attribute header, said run header, and said text characters define at least one text run, said text run including a plurality of characters having the same encoding, thereby allowing an operating system of a computer system to convert data representing text of a first character set to data representing the text in a second character set.

18. The computer system of claim 17, wherein said attribute header comprises a style definition for at least a portion of said text characters.

19. The computer system of claim 18, wherein said attribute header comprises a language definition for at least a portion of said text characters.

20. The computer system of claim 19, wherein said attribute header comprises a pronunciation for at least one character in said string of text characters.

21. The computer system of claim 18, wherein said portion of text characters is defined by the positions of the first and last text characters for which said style applies.

22. The computer system of claim 17, wherein said run header comprises an encoding for at least a portion of said text characters.

23. The computer system of claim 22, wherein said portion of text characters over which said style definition is applicable is different from said portion of text characters over which said encoding is applicable.

24. The computer system of claim 21, wherein said portion of text characters over which said style definition is applicable is the same as said portion of text characters over which said encoding is applicable.

25. The computer system of claim 17, wherein said run header further comprises a run length identifier and a run type identifier.

26. The computer system of claim 18, wherein said attribute header further comprises a style length identifier and a style identifier.

27. The computer system of claim 17, wherein said text object further includes a text object header comprising a total object size identifier and an object attribute indicator.

28. The computer system of claim 27, wherein said object attribute header includes a persistence identifier for identifying said text object as a permanent text object or a ephemeral text object.

29. The computer system of claim 27, wherein said object attribute header further includes a version identifier.

30. The computer system of claim 17, wherein said annotation portion comprises an annotation header including
a) a format flag for determining whether said annotation portion is formatted in a long or short format; and
b) a change flag to indicate whether any changes have been made to the region of text defined encompassed by said annotation portion.

31. The computer system of claim 17, wherein said data input system further comprises means for setting a normalization option flag in said text object.

32. The computer system of claim 17, further comprising a computer-controlled text object management facility for managing said text object, said computer-controlled text object management facility being effective to perform operations on said text object selected from the group consisting of creation operations, destruction operations, insertion operations and extraction operations.

33. A computer-readable medium including computer program instructions, said computer readable medium comprising:

computer program instructions for providing
a primary data portion comprising a string of text characters and at least one run header containing a run length field providing the length of a substring within said string of text characters; and
an annotation portion comprising an attribute header containing a style definition field characterizing a substring within said string of text characters;

wherein said attribute header in said annotation portion includes information characterizing and describing a plurality of said text characters, and said run header in said primary data portion includes information characterizing and describing a plurality of said text characters, and wherein said attribute header, said run header, and said text characters define at least one text run, said text run including a plurality of characters having the same encoding, thereby allowing an operating system of a computer system to convert data representing text of a first character set to data representing the text in a second character set.

34. A computer-readable medium as recited in claim 33, wherein said attribute header comprises a style definition for at least a portion of said text characters.

35. A computer-readable medium as recited in claim 34 wherein said attribute header comprises a language definition for at least a portion of said text characters.

36. A computer-readable medium as recited in claim 35, wherein said attribute header comprises a pronunciation for at least one character in said string of text characters.

37. A computer-readable medium as recited in claim 33 wherein said run header comprises an encoding for at least a portion of said text characters.

38. A computer-readable medium as recited in claim 37 wherein said portion of text characters over which said style definition is applicable is different from said portion of text characters over which said encoding is applicable.

39. A computer-readable medium as recited in claim 37 wherein said portion of text characters over which said style definition is applicable is the same as said portion of text characters over which said encoding is applicable.

40. A computer-readable medium as recited in claim 37 wherein said run header further comprises a run length identifier and a ran type identifier.

41. A computer-readable medium as recited in claim 33 wherein said attribute header further comprises a style length identifier and a style identifier.

42. A computer-readable medium as recited in claim 33 wherein said text object further includes a text object header comprising a total object size identifier and an object attribute indicator.

43. A computer-readable medium as recited in claim 42 wherein said object attribute header includes a persistence identifier for identifying said text object as a permanent text object or a ephemeral text object.

44. A computer-readable medium as recited in claim 43 wherein said object attribute header further includes a version identifier.

45. A computer-readable medium as recited in claim 33 wherein said annotation portion comprises an annotation header including a format flag for determining whether said annotation portion is formatted in a long or short format; and a change flag to indicate whether any changes have been made to the region of text defined encompassed by said annotation portion.

46. A computer-readable medium as recited in claim 33 wherein said text object further comprises a normalization option flag.

47. A computer-readable medium including computer program instructions, said computer readable medium comprising:

a) computer program instructions for providing
      i) a string of text characters,
      ii) at least one run header containing a run length field providing the length of a substring within said string of text characters, and
      iii) at least one attribute header containing a style definition field characterizing a substring within said string of text characters;
   b) computer program instructions storing under computer control said string of text characters and said run header in a primary data portion; and
   c) computer program instructions for storing under computer control said attribute header in an annotation portion;

wherein said attribute header in said annotation portion includes information characterizing and describing a plurality of said text characters and said run header in said primary data portion includes information characterizing and describing a plurality of said text characters where said attribute header, said run header, and said text characters define at least one text run, said text run including a plurality of characters having the same encoding, thereby allowing an operating system of the computer system to convert data representing text of a first character set to data representing the text in a second character set.

48. The computer readable medium of claim 47, further comprising program instructions for defining an encoding for at least a portion of said text characters in said run header.

49. The computer readable medium of claim 47, further comprising program instructions for performing a computer-controlled text object management operation on said text object, said computer-controlled text object management operation being selected from the group consisting of creation operations, destruction operations, insertion operations and extraction operations.

* * * * *